United States Patent
Hosoya et al.

(10) Patent No.: US 12,499,989 B2
(45) Date of Patent: Dec. 16, 2025

(54) MEDICAL INFORMATION PROCESSING APPARATUS CAPABLE OF DISCRIMINATING CAPTURED IMAGE AND PROCESSED IMAGE, MEDIAL INFORMATION PROCESSING METHOD, AND STORAGE MEDIUM

(71) Applicant: CANON KABUSHIKI KAISHA, Tokyo (JP)

(72) Inventors: Yuma Hosoya, Saitama (JP); Keisuke Arima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 18/056,942

(22) Filed: Nov. 18, 2022

(65) Prior Publication Data

US 2023/0162840 A1    May 25, 2023

(30) Foreign Application Priority Data

Nov. 25, 2021  (JP) ................. 2021-191529
Nov. 25, 2021  (JP) ................. 2021-191530

(51) Int. Cl.
  *G16H 30/40*  (2018.01)
  *G16H 30/20*  (2018.01)

(52) U.S. Cl.
  CPC ............ *G16H 30/40* (2018.01); *G16H 30/20* (2018.01)

(58) Field of Classification Search
  None
  See application file for complete search history.

(56) References Cited

U.S. PATENT DOCUMENTS

| | | | | |
|---|---|---|---|---|
| 10,015,308 B2* | 7/2018 | Cho | .................. | H04N 23/632 |
| 10,440,257 B2* | 10/2019 | Kobayashi | ............ | H04N 23/63 |
| 10,991,137 B2* | 4/2021 | Aoyama | ................. | G06T 11/60 |
| 2002/0082484 A1* | 6/2002 | Baba | ..................... | A61B 6/463 |
| | | | | 600/300 |
| 2005/0162682 A1* | 7/2005 | Aritomi | ................ | G06K 15/02 |
| | | | | 358/1.14 |
| 2008/0212854 A1* | 9/2008 | Fukatsu | ................ | G16H 50/20 |
| | | | | 382/128 |

(Continued)

FOREIGN PATENT DOCUMENTS

| | | |
|---|---|---|
| JP | 2002185764 A | 6/2002 |
| JP | 2004295184 A | 10/2004 |

(Continued)

*Primary Examiner* — Maikhanh Nguyen
(74) *Attorney, Agent, or Firm* — Canon U.S.A., Inc. IP Division

(57) ABSTRACT

A medical information processing apparatus includes a transmission unit configured to transmit an original image, which is a medical image captured by an imaging apparatus and which serves as a processing object in an external system, to the external system, an acquisition unit configured to acquire a processed image, which is generated from the transmitted original image being subjected to processing in the external system, and appended information about the processed image, and an association unit configured to search for the original image with use of the appended information about the processed image from a storage unit storing medical images and associate the appended information about the processed image and image information about the original image with each other.

6 Claims, 20 Drawing Sheets

(56) References Cited

U.S. PATENT DOCUMENTS

| | | | | |
|---|---|---|---|---|
| 2009/0276731 A1* | 11/2009 | Yamakawa | ......... | G06F 3/04847 |
| | | | | 715/833 |
| 2009/0303341 A1* | 12/2009 | Mikawa | ............... | H04N 1/6027 |
| | | | | 348/222.1 |
| 2011/0052034 A1* | 3/2011 | Watanabe | ............. | G06T 7/0012 |
| | | | | 378/115 |
| 2019/0108905 A1* | 4/2019 | Zhang | ................... | G06T 7/0012 |
| 2019/0156480 A1* | 5/2019 | Kawanishi | ............. | G01N 23/04 |

FOREIGN PATENT DOCUMENTS

| | | | |
|---|---|---|---|
| JP | 2006192057 | A | 7/2006 |
| JP | 2006312025 | A | 11/2006 |
| JP | 2010246628 | A | 11/2010 |
| JP | 2016035717 | A | 3/2016 |
| JP | 2018000605 | A | 1/2018 |

\* cited by examiner

| IMAGE ID | SERIES ID | EXAMINATION ID | ORIGINAL IMAGE ID | SERIES No. | IRRADIATION TIME |
|---|---|---|---|---|---|
| 1 | 1 | 1 | — | 1 | 14:00:00 |
| 3 | 1 | 1 | — | 2 | 14:03:00 |
| 5 | 3 | 2 | — | 1 | 15:00:00 |
| 7 | 4 | 2 | — | 2 | 15:06:00 |

51

| IMAGE ID | SERIES ID | EXAMINATION ID | ORIGINAL IMAGE ID | SERIES No. | IRRADIATION TIME |
|---|---|---|---|---|---|
| 2 | — | 1 | 1 | 1 | 14:00:00 |

52

| IMAGE ID | SERIES ID | EXAMINATION ID | ORIGINAL IMAGE ID | SERIES No. | IRRADIATION TIME |
|---|---|---|---|---|---|
| 4 | — | 1 | — | — | 14:03:00 |

53

| IMAGE ID | SERIES ID | EXAMINATION ID | ORIGINAL IMAGE ID | SERIES No. | IRRADIATION TIME |
|---|---|---|---|---|---|
| 6 | — | 2 | — | 1 | — |

FIG.4

| IMAGE ID | SERIES ID | EXAMINATION ID | ORIGINAL IMAGE ID | SERIES No. | IRRADIATION TIME |
|---|---|---|---|---|---|
| 1 | 1 | 1 | — | 1 | 14:00:00 |
| 2 | 1 | 1 | 1 | 1 | 14:00:00 |
| 3 | 1 | 1 | — | 2 | 14:03:00 |
| 4 | 2 | 1 | — | — | 14:03:00 |
| 5 | 3 | 2 | — | 1 | 15:00:00 |
| 6 | 3 | 2 | — | 1 | — |
| 7 | 4 | 2 | — | 2 | 15:06:00 |

FIG.5A

| EXAMINED | PATIENT ID | PATIENT NAME | SEX | DATE OF BIRTH | AGE |
|---|---|---|---|---|---|
| O001 | P333 | Saburo CANON | MALE | 1981/11/11 | 29 years |
| O002 | P222 | Jiro CANON | MALE | 2002/2/2 | 7 years |
| O003 | P111 | Taro CANON | MALE | 2001/1/10 | 8 years |
| O004 | P777 | Hanako CANON | FEMALE | 1977/7/7 | 12 years |
| O005 | P123 | Ichiro CANON | MALE | 2003/3/3 | 3 years |
| O006 | P444 | Shiro CANON | MALE | 1964/4/4 | 45 years |
| O007 | P555 | Goro CANON | MALE | 1955/5/5 | 54 years |
| O008 | P666 | Rokuro CANON | MALE | 1976/6/6 | 33 years |

PATIENT NAME:
DATE OF BIRTH: / /
PATIENT ID:
AGE:
SEX: ○ MALE ○ FEMALE ○ OTHERS

CONFIRMATION

PATIENT NAME:
PATIENT ID:
DATE OF BIRTH:
AGE:
SEX:

EXAMINATION ID:

IMAGING INFORMATION INPUT  106
EXAMINATION START  107

| | PATIENT ID | PATIENT NAME | SEX | DATE OF BIRTH | AGE |
|---|---|---|---|---|---|
| O001 | P333 | Saburo CANON | MALE | 2003/3/3 | 6 years |
| O002 | P222 | Jiro CANON | MALE | 2002/2/2 | 7 years |
| O003 | P111 | Taro CANON | MALE | 2001/1/10 | 8 years |
| O004 | P777 | Hanako CANON | FEMALE | 1977/7/7 | 12 years |
| O005 | P123 | Ichiro CANON | MALE | 1981/11/11 | 27 years |
| O006 | P444 | Shiro CANON | MALE | 1964/4/4 | 45 years |
| O007 | P555 | Goro CANON | MALE | 1955/5/5 | 54 years |
| O008 | P666 | Rokuro CANON | MALE | 1976/6/6 | 33 years |

PATIENT NAME:
DATE OF BIRTH: / /
PATIENT ID:
AGE:
SEX: ○ MALE ○ FEMALE ○ OTHERS
CONFIRMATION

PATIENT NAME: Taro CANON
PATIENT ID: P111
DATE OF BIRTH: 2001/1/10
AGE: 8 years
SEX: MALE

EXAMINATION ID: O003

FRONT CHEST — SENSOR A
LATERAL CHEST — SENSOR A

IMAGING INFORMATION INPUT
EXAMINATION START

FIG.14

| IMAGING METHOD ID | NAME | SENSOR | EXTERNAL PROCESSING | OUTPUT TO IMAGE MANAGEMENT SERVER |
|---|---|---|---|---|
| 1 | FRONT CHEST | SENSOR A | ON | ON |
| 2 | LATERAL CHEST | SENSOR A | OFF | ON |
| 3 | FRONT ABDOMEN | SENSOR A | ON | OFF |
| 4 | LATERAL ABDOMEN | SENSOR A | OFF | OFF |

| EXTERNAL PROCESSING ID | IMAGING METHOD ID | PROCESSING REQUEST DESTINATION | PROCESSING CONTENT |
|---|---|---|---|
| 1 | 1 | SYSTEM A | PROCESSING 1 |
| 2 | 3 | SYSTEM A | PROCESSING 2 |
| 3 | 1 | SYSTEM B | PROCESSING 1 |

FIG.15

| IMAGE ID | SERIES ID | IMAGING METHOD ID | SOURCE | PROCESSING CONTENT |
|---|---|---|---|---|
| 1 | 1 | 1 | IMAGING APPARATUS | — |
| 2 | 1 | 1 | SYSTEM A | PROCESSING 1 |
| 3 | 1 | 1 | SYSTEM B | PROCESSING 1 |
| 4 | 2 | 2 | IMAGING APPARATUS | — |
| 5 | 3 | 3 | IMAGING APPARATUS | — |
| 6 | 3 | 3 | SYSTEM A | PROCESSING 2 |
| 7 | 4 | 1 | IMAGING APPARATUS | — |

MEDICAL INFORMATION PROCESSING APPARATUS CAPABLE OF DISCRIMINATING CAPTURED IMAGE AND PROCESSED IMAGE, MEDIAL INFORMATION PROCESSING METHOD, AND STORAGE MEDIUM

BACKGROUND

Field of Disclosure

Aspects of the present disclosure generally relate to a medical information processing apparatus, a medical information processing method, and a non-transitory computer-readable storage medium.

Description of Related Art

Heretofore, there has been known a radiographic imaging system including a radiation irradiation apparatus which radiates radiation (for example, X-rays) to a subject, and a radiation detection apparatus which detects an intensity distribution of radiation transmitted through the subject, and thus the system captures a radiographic image of an object.

In performing an examination using radiation (a radiographic examination), usually, examination information including, for example, an imaging region and an imaging method is set by a doctor of each clinical department. Then, radiographic imaging using a radiographic imaging system is performed based on the set examination information.

In recent years, artificial intelligence (AI) technology has progressed toward medical image diagnosis support. While the radiographic imaging system is equipped with image processing directed to diagnosis support, utilizing image processing usable for other than the radiographic imaging system enables obtaining more helpful support for doctors.

The radiographic imaging system is able to cooperate with an external image processing system in the form of transmitting and receiving an image targeted for processing and an image subjected to processing and thus provide, for diagnosis, an image subjected to processing with which the radiographic imaging system is not equipped. For example, Japanese Patent Application Laid-Open No. 2004-295184 discusses a configuration which transmits a medical image to a processing server to perform computer-aided diagnosis (CAD) processing.

It is desirable that a processed image generated by an external system based on a captured image generated by the radiographic imaging system set as an original image be associated with the original image. However, depending on external systems, there is a case where information for associating the processed image with the original image is not appended to the processed image. In that case, association being performed by a manual operation of the operator or changing of the specifications of the external system side or the reception side being performed for every connection destination becomes necessary, which is very inconvenient because such process becomes lengthy and prone to inadvertent errors.

Moreover, as another issue, there is a case where a processed image generated by an external system based on a captured image generated by the radiographic imaging system set as an original image has a restriction different from that on the captured image, such as a restriction in which, for the purpose of retaining a processing effect of the processed image, reprocessing by the radiographic imaging system should not be applied to the processed image.

However, in a case where the captured image and the processed image have been displayed in a tabulated manner, it may be impossible to discriminate between the captured image and the processed image at first glance.

SUMMARY OF THE DISCLOSURE

An aspect of the present disclosure is directed to improving operation efficiency by automatically performing association between a captured image and a processed image generated by an external system based on the captured image set as an original image.

Moreover, another aspect of the present disclosure is directed to a system and method for enabling discriminating between the captured image and the processed image.

Furthermore, yet another aspect of the present disclosure is directed to a system and method for producing function effects which are derived from respective configurations included in the following exemplary embodiments.

According to an aspect of the present disclosure, a medical information processing apparatus includes a transmission unit configured to transmit an original image, which is a medical image captured by an imaging apparatus and which serves as a processing object in an external system, to the external system, an acquisition unit configured to acquire a processed image, which is generated from the transmitted original image being subjected to processing in the external system, and appended information about the processed image, and an association unit configured to search for the original image with use of the appended information about the processed image from a storage unit storing medical images and associate the appended information about the processed image and image information about the original image with each other.

According to another aspect of the present disclosure, a medical information processing apparatus includes a transmission unit configured to transmit an original image, which is a medical image captured by an imaging apparatus and which serves as a processing object in an external system, to the external system, an acquisition unit configured to acquire a processed image, which is generated from the transmitted original image being subjected to processing in the external system, and a display control unit configured to display a thumbnail of the original image and a thumbnail of the processed image on a display unit, wherein the display control unit displays the thumbnail of the processed image in a display form different from that for the thumbnail of the original image in such a manner that the processed image being an image subjected to processing in the external system is discriminable.

Further features of the present disclosure will become apparent from the following description of exemplary embodiments with reference to the attached drawings.

BRIEF DESCRIPTION OF THE DRAWINGS

FIG. 3 illustrates examples of pieces of information about respective captured images stored in a storage unit illustrated in FIG. 2, and pieces of information about respective processed images acquired by an information acquisition unit illustrated in FIG. 2.

FIG. 4 illustrates a table with tabulated examples of pieces of information about respective captured images, and pieces of information about respective processed images stored in the storage unit illustrated in FIG. 2.

FIG. 14 illustrates an example of an imaging method table stored in a storage unit included in a radiographic imaging apparatus according to a sixth exemplary embodiment of the present disclosure.

FIG. 15 illustrates an example of an image table stored in the storage unit included in the radiographic imaging apparatus according to the sixth exemplary embodiment.

DESCRIPTION OF THE EMBODIMENTS

Various exemplary embodiments, features, and aspects of a radiographic imaging system disclosed in the present specification will be described in detail below with reference to the drawings. However, constituent elements described in the exemplary embodiments are merely illustrated as an example, and the technical scope of the radiographic imaging system disclosed in the present specification is made definite by the claims and should not be construed to be limited by the following individual exemplary embodiments. Moreover, the disclosure in the present specification is not limited by the following exemplary embodiments and can be modified or altered in various manners (including an organic combination of some or all of the exemplary embodiments) based on a gist disclosed in the present specification, and such modifications or alterations should not be excluded from the scope of the disclosure in the present specification. Thus, all of the configurations obtained by combining some or all of the following exemplary embodiments and modification examples are also included in the exemplary embodiments disclosed in the present specification. Furthermore, while, in the following description, a radiographic imaging system is described as an example, the modality which images a subject can also be another type of medical imaging apparatus, such as a magnetic resonance imaging (MRI) apparatus, an X-ray computed tomography (CT) apparatus, a three-dimensional ultrasonic imaging apparatus, a photoacoustic tomography apparatus, a positron emission tomography (PET)/single-photon emission computed tomography (SPECT) apparatus, or an optical coherence tomography (OCT) apparatus. Thus, a series of processing operations according to each exemplary embodiment can be implemented by a medical information processing system including any type of medical imaging apparatus and a medical information processing apparatus, and can be applied to not only a radiographic image but also another type of medical image. Moreover, an image in the present disclosure includes not only the one in the state of being displayed on a display unit but also the one in the state of being stored as image data in a storage unit or a database or in the state of being transmitted or received.

<Configuration of Radiographic Imaging System>

Figure 1:
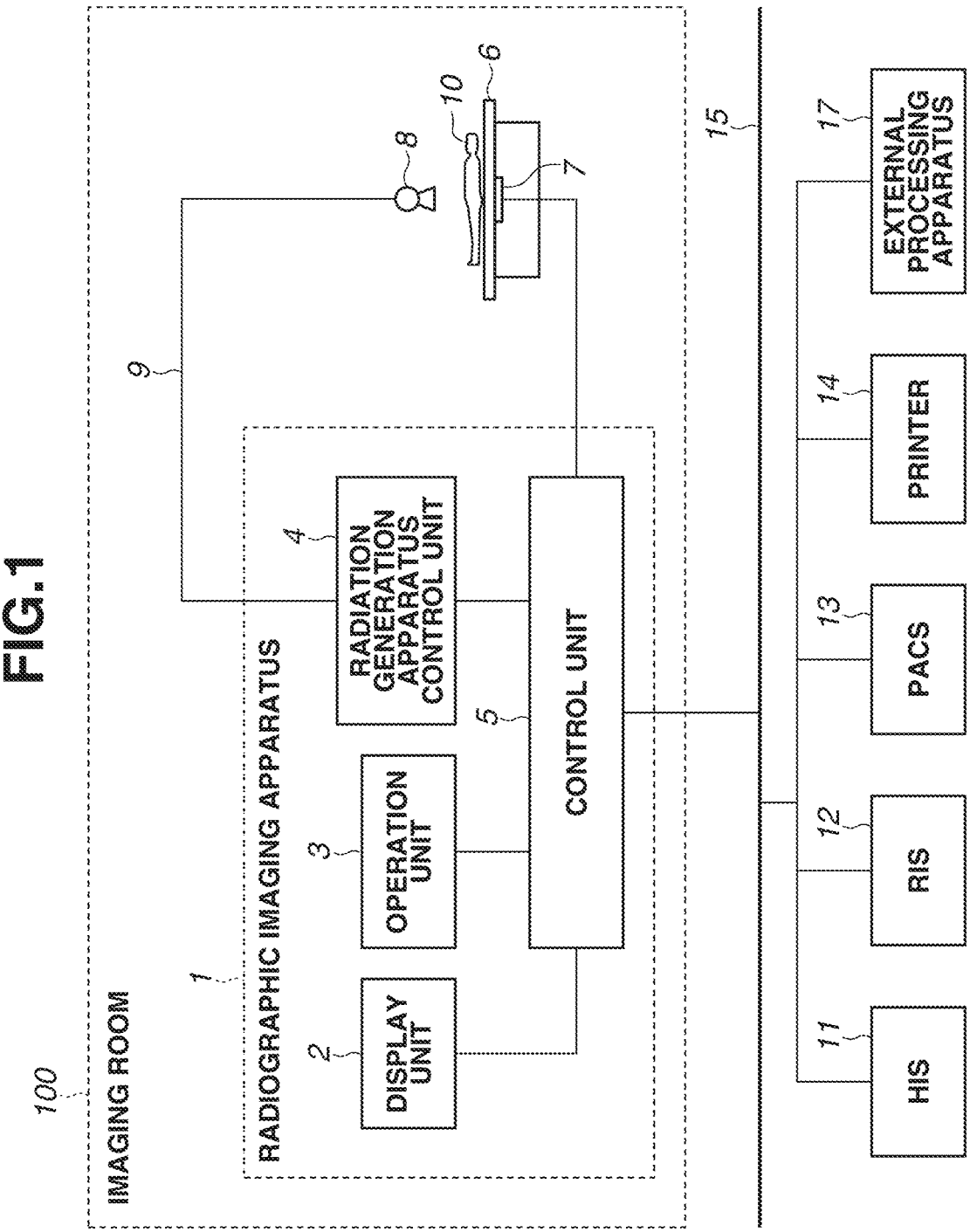
FIG. 1 is a diagram illustrating an example of an outline configuration of a medical information processing system, which includes a radiographic imaging apparatus and a medical information processing apparatus, according to a first exemplary embodiment of the present disclosure.

A first exemplary embodiment of present disclosure is described with reference to FIG. 1. FIG. 1 is a diagram illustrating a configuration example of a radiographic imaging system according to the first exemplary embodiment. As illustrated in FIG. 1, the radiographic imaging system in the first exemplary embodiment includes a radiographic imaging apparatus 1 and a hospital information system (HIS) 11, which manages the progress of an examination.

Moreover, the radiographic imaging system in the first exemplary embodiment further includes a radiology information system (RIS) 12, which transmits an examination order to the radiographic imaging apparatus 1.

Additionally, a picture archiving and communication system (PACS) 13, which manages a radiographic image, a printer 14, which performs print outputting of a radiographic image, and an external processing apparatus 17, which performs processing on a radiographic image, are connected to the radiographic imaging system, using Digital Imaging and Communications in Medicine (DICOM) standards, in the first exemplary embodiment.

The HIS 11 is a hospital management system and includes a server, which manages accounting information. When performing radiographic imaging, the operator inputs an examination instruction via a terminal (input unit) of the HIS 11.

Then, the HIS 11 transmits request information to a radiology department of the hospital, which is a request destination of radiographic imaging. This request information is referred to as an "examination order". The examination order includes, for example, the name of a department serving as a request source, an examination identifier (ID), an examination item, and patient information (test object information) about a subject (test object).

In response to the RIS 12 receiving the examination order, the radiology department appends imaging information about radiographic imaging (for example, imaging region information, imaging direction information, and manipulation information) as an imaging protocol to the examination order, and transmits the examination order with the imaging protocol appended thereto to the radiographic imaging apparatus 1. The radiographic imaging apparatus 1 performs radiographic imaging according to the received examination order. The radiographic imaging apparatus 1 acquires a captured radiographic image, generates examination information in which the radiographic image and the examination order are associated with each other, and outputs the radiographic image and the examination information.

The PACS 13 is a server mainly aimed at image management. A high-definition monitor connected to the PACS 13 is used to perform an operation of assuring the quality of radiographic images, detailed post-processing, and a diagnostic operation. In this way, a radiographic image acquired by the radiographic imaging apparatus 1 is transmitted to the PACS 13.

Moreover, implementation information about an examination in the radiographic imaging apparatus 1 (for example, an image identifier (ID) and the date and time of imaging) is transmitted to the HIS 11. The implementation information transmitted to the HIS 11 is used for not only progress management for examination but also accounting processing after examination. An image identifier or ID can be used within the context of the DICOM Standard, as defined by ISO 9834-1 to ensure global uniqueness of each medical image.

The external processing apparatus 17 is an apparatus which performs, for example, image processing on a radiographic image. The external processing apparatus 17 performs, for example, diagnosis support processing using artificial intelligence (AI) technology, and transmits the generated processed image to apparatuses such as the radiographic imaging apparatus 1 and the PACS 13. The radiographic imaging apparatus 1 presents the processed image received from the external processing apparatus 17 as well as a captured image (an original image before being processed by an external system), thus providing processing with which the radiographic imaging apparatus 1 is not equipped.

The radiographic imaging apparatus 1, the HIS 11, the RIS 12, the PACS 13, the printer 14, and the external processing apparatus 17 are interconnected via, for example, a network 15 which is configured with, for example, a local area network (LAN) or a wide area network (WAN).

Furthermore, one or a plurality of computers is included in each of these apparatuses. Each computer includes, for example, a main control unit, such as a central processing unit (CPU), and storage units, such as a read-only memory (ROM) and a random access memory (RAM). Moreover, the computer can further include, for example, a communication unit, such as a network card, and input and output units, such as a keyboard, a display, and a touch panel. These constituent units are electrically interconnected via, for example, a bus and are controlled by the main control unit executing programs stored in the storage units.

As illustrated in FIG. 1, the radiographic imaging apparatus 1, which performs radiographic imaging, is arranged in an imaging room 100. Moreover, a radiation generation apparatus control unit 4, which generates radiation, a radiation detector 7, which captures a radiographic image by detecting radiation transmitted through a subject 10, and an imaging table 6 are also arranged in the imaging room 100.

The radiographic imaging apparatus 1 further includes a display unit 2, which displays a radiographic image and various pieces of information, an operation unit 3, via which the operator performs an operation, and a control unit 5, which controls each constituent element.

The radiation generation apparatus control unit 4 sets an imaging condition for radiation in a radiation generation unit 8 and thus controls the radiation generation unit 8. The radiation generation unit 8 functions as a radiation source for generating radiation. The radiation generation unit 8 is implemented by, for example, a radiation bulb and radiates radiation toward the subject 10 (for example, a specific region of the subject).

The radiation generation unit 8 is able to radiate radiation in a desired radiation range. A diaphragm (not illustrated), which blocks radiation, is arranged on a radiation surface of the radiation generation unit 8. The operator is able to adjust the radiation range of radiation to be radiated from the radiation generation unit 8, by controlling the diaphragm, which blocks radiation.

The radiographic imaging system further includes a radiation detector 7, which detects radiation radiated from the radiation generation unit 8. The radiation detector 7 detects radiation transmitted through the subject 10, and outputs image data corresponding to the detected radiation. Furthermore, image data can be referred to as a "radiographic image" in another way.

Specifically, the radiation detector 7 detects radiation transmitted through the subject 10 as electric charge equivalent to the amount of transmitted radiation. For example, a direct conversion type sensor, which directly converts radiation, such as amorphous selenium (a-Se) which converts radiation into electric charge, or an indirect conversion type sensor using a photoelectric conversion element, such as amorphous silicon (a-Si), and scintillator, such as cesium iodide (CsI), is used as the radiation detector 7.

The radiation detector 7 performs analog-to-digital (A/D) conversion of the detected electric charge to generate image data, and accumulates the image data in a storage unit (not illustrated). The radiation detector 7 is able to append image information (an image ID, the date and time of imaging, and the transfer status of image data) to image data and then transfer the image information as well as the image data to the radiographic imaging apparatus 1.

The display unit 2 is implemented by, for example, a liquid crystal display and displays various pieces of information to the operator (for example, a radiographing engineer or a doctor). The operation unit 3 is configured with, for example, a mouse and operation buttons, and inputs various instructions from the operator to the respective constituent elements. Furthermore, the display unit 2 and the operation unit 3 can be implemented as a touch panel obtained by integrating them.

The control unit 5 of the radiographic imaging apparatus 1 is connected to the radiation detector 7 via a wireless LAN. For example, image data and control signals are transmitted and received between the control unit 5 and the radiation detector 7. Thus, image data stored in the radiation detector 7 by radiographic imaging is output (transferred) to the control unit 5 via the wireless LAN.

<Description of Radiographic Imaging System>

The radiographic imaging system in the first exemplary embodiment is described with reference to FIG. 2. The radiographic imaging apparatus 1 includes the control unit 5, which performs image processing on a radiographic image output from the radiation detector 7 to generate an image. The control unit 5 includes an application function which runs on a computer. The control unit 5 controls an operation of the radiation detector 7, outputs a radiographic image to the display unit 2, and outputs a graphical user interface (GUI) to the display unit 2. Thus, the control unit 5 is equivalent to a display control unit which displays a thumbnail of the medical image and a thumbnail of the processed image on a display unit. Moreover, the control unit 5 also functions as a reception unit which receives an instruction for image editing to a medical image displayed on a display unit and is thus able to perform image editing, such as clipping or annotation, based on an instruction from the operator.

The control unit 5 includes an imaging control unit 21, which performs imaging control of the radiation detector 7, an image processing unit 22, which performs image processing of a radiographic image obtained by imaging, and a storage unit 23, which stores a radiographic image output from the radiation detector 7 and various pieces of information, such as an examination order, an imaging protocol, and an imaging method. In at least one embodiment, storage unit 23 may include a data storage device such as a solid state hard drive. Moreover, the control unit 5 further includes an examination management unit 24, which manages examination information in which a radiographic image and an examination order are associated with each other, an input and output unit 27, which outputs a generated image object to the outside or inputs a generated image object from the outside, an information acquisition unit 28, which acquires information about a processed image obtained by external processing, a search condition determination unit 29, which determines a search condition for identifying image information about a captured image serving as an original image for processing from information about the processed image, and an image information identification unit 30, which identifies image information stored in the storage unit 23 from the determined search condition.

The storage unit 23 stores examination information which is managed by the examination management unit 24, an imaging protocol, an imaging method, a radiographic image output from the radiation detector 7, and various pieces of information required for examination management. Moreover, the storage unit 23 stores an imaging protocol associated with the examination order along with discrimination information for discriminating the imaging protocol.

A table 50 illustrated in FIG. 3 shows examples of pieces of image information about respective captured images stored in the storage unit 23. As the image information, for example, an image ID, a series ID, an examination ID, an original image ID, a series number (No.), and irradiation time (imaging time) are stored for every image. Thus, the image information includes an image identifier for discriminating an image, a series identifier for discriminating a series to which the image belongs, and an examination identifier for discriminating an examination in which the image has been captured, and can further include information about a series number and imaging time.

Tables 51, 52, and 53 show examples of pieces of information appended to respective processed images received by the input and output unit 27 and acquired by the information acquisition unit 28. The tables 51, 52, and 53 can show pieces of information about respective processed images obtained by processing operations performed by the respective different processing systems or can show pieces of information about respective processed images obtained by processing operations all performed by the same processing system. An image ID is appended to every image, and the values of image information serving as an original image are appended as a series ID, an examination ID, a series No., and irradiation time. Moreover, an original image ID is appended as an image ID of image information serving as an original image. Here, it is assumed that images have been received from the respective different processing systems. Therefore, in the table 51, a series ID is not appended, in the table 52, a series ID, an original image ID, and a series No. are not appended, and, in the table 53, a series ID, an original image ID, and irradiation time are not appended.

FIG. 4 is a table of states in which the pieces of image information shown in the table 50 illustrated in FIG. 3 and the processed images that are based on the pieces of image information shown in the tables 51, 52, and 53 illustrated in FIG. 3 are associated with each other.

The examination management unit 24 manages an imaging protocol, with which the examination order is associated and in which, for example, an imaging method, an imaging condition, and an image processing condition are defined. For example, in a case where examination information is generated by the radiographic imaging apparatus 1, the examination management unit 24 is able to generate new examination information by associating subject information input via the operation unit 3 and the imaging protocol with each other. On the other hand, in a case where an examination is requested from the RIS 12, the examination management unit 24 extracts an imaging protocol stored in the storage unit 23 with use of discrimination information about the imaging protocol associated with the received examination order. Then, the examination management unit 24 generates new examination information by associating the extracted imaging protocol with the examination order. The newly generated examination information is then stored in the storage unit 23. Moreover, the examination management unit 24 performs association between appended information appended to a processed image acquired by the information acquisition unit 28 and image information identified by the image information identification unit 30. Moreover, the examination management unit 24 performs association between a captured image and a processed image with use of appended information appended to the processed image and image information about the captured image. Here, the examination management unit 24 performs association by, for example, further appending, to a processed image, image information about a captured image serving as an original of the processed image or by rewriting appended information about a processed image into image information about a captured image. Thus, the examination management unit 24 can compare image information about a captured image and appended information about a processed image with each other, and, if there is lacking information in the appended information with respect to the image information, the examination management unit 24 can supplement information with use of the image information or can rewrite the appended information itself into image information. The generated information is then stored in the storage unit 23.

The imaging control unit 21 transmits, to the radiation detector 7, a transfer request signal for requesting transfer of a radiographic image accumulated in the radiation detector 7, and receives a radiographic image from the radiation detector 7. The imaging control unit 21 manages the received radiographic image along with radiation detector information about the radiation detector 7. Moreover, the imaging control unit 21 associates the radiographic image with the examination information and the imaging protocol, which are managed by the examination management unit 24.

The image processing unit 22 performs image processing on a radiographic image with use of the imaging protocol and the image information obtained from the imaging control unit 21. The radiographic image subjected to image processing here is displayed on the display unit 2. Alternatively, radiographic image subjected to image processing here is externally output from the input and output unit 27. The image processing unit 22 performs image processing for adjusting an image itself, such as for luminance or contrast. Additionally, the image processing unit 22 is also able to perform modification processing, such as clipping or annotation, on the adjusted radiographic image.

The input and output unit 27 receives inputting of an examination order from the RIS 12 and inputting of a processed image from the external processing apparatus 17. Moreover, the input and output unit 27 outputs a radiographic image to an external apparatus, such as the PACS 13, the printer 14, or the external processing apparatus 17 and outputs examination implementation information to the HIS 11. Thus, the input and output unit 27 is equivalent to an example of a transmission unit which transmits an original image serving as a processing object to an external system.

The information acquisition unit 28 acquires information appended to the processed image obtained by the input and output unit 27. Moreover, the information acquisition unit 28 outputs the acquired information to the examination management unit 24 and the search condition determination unit 29.

The search condition determination unit 29 determines, as a search condition, information for identifying image information about a captured image serving as an original image based on information about a processed image acquired by the information acquisition unit 28. Thus, the search condition determination unit 29 is equivalent to an example of a determination unit which determines, as a search condition, information for use in searching for an original image out of pieces of information included in the appended information. The search condition determination unit 29 outputs the determined search condition to the image information identification unit 30.

The image information identification unit 30 identifies image information about a captured image serving as an original image from the storage unit 23 with use of the search condition determined by the search condition determination unit 29. The identified image information is associated with the processed image by the examination management unit 24 and is then stored in the storage unit 23. Thus, the examination management unit 24 is equivalent to an example of an association unit which associates image information about an original image searched for with use of appended information about a processed image with the appended information about the processed image. Moreover, the examination management unit 24 is equivalent to an example of an association unit which associates image information about an original image searched for according to the search condition determined by the search condition determination unit 29 with the appended information about the processed image.

Thus far is the description of an example of a configuration of the radiographic imaging system according to the first exemplary embodiment. Furthermore, the configuration illustrated in FIG. 1 is merely an example and thus can be modified or altered as appropriate. For example, While, in FIG. 1, various apparatuses are connected to the radiographic imaging apparatus 1 via the network 15, the radiographic imaging apparatus 1 does not necessarily need to be connected to such apparatuses. A configuration in which a diagnostic image is output to a mobile medium such as a digital versatile disc (DVD) and is then input to various apparatuses via the mobile medium can be employed. Moreover, the network 15 can be configured with a wire or a part of the network 15 can be configured with a wireless signal transmission path.

<Imaging Processing>

Here, a procedure of processing in capturing a radiographic image is described along the flow of an examination performed by the radiographic imaging system illustrated in FIG. 1.

First, the operator inputs patient information and examination information to the radiographic imaging apparatus 1 according to a written examination request or an examination request from the RIS 12. The patient information includes, for example, a patient name and a patient ID, and the examination information includes imaging information which defines the content of imaging to be performed on a patient.

Figure 5:
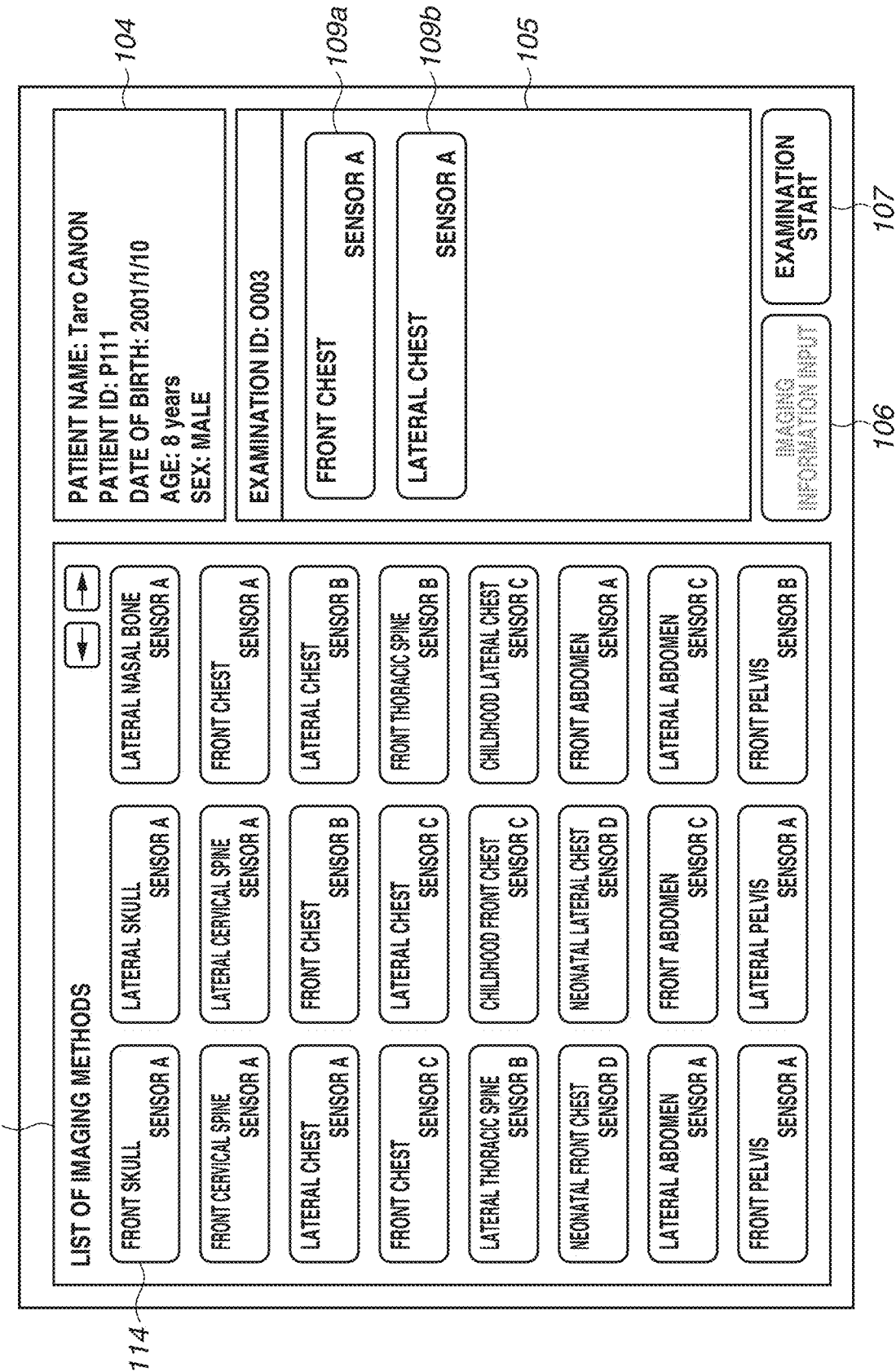
FIGS. 5A, 5B, and 5C are diagrams illustrating examples of a new examination input screen which is displayed on a display unit illustrated in FIG. 1 in the first exemplary embodiment.

The radiographic imaging apparatus 1 displays a new examination input screen such as that illustrated in FIG. 5A under the control of the control unit 5. As illustrated in FIG. 5A, the new examination input screen is configured to include a patient information input area 101, a patient information confirmation button 102, and a requested examination list 103. Moreover, the new examination input screen further includes a patient information display area 104, an imaging information display area 105, an imaging information input button 106, and an examination start button 107.

In the requested examination list 103, examinations received from the RIS 12 are displayed side by side in a listed manner.

In response to the operator selecting any examination from the requested examination list 103, as illustrated in FIG. 5B, in the patient information display area 104, patient information (including, for example, a patient ID, a patient name, and a date of birth) corresponding to a patient for the selected examination. Moreover, in the imaging information display area 105, an examination ID is displayed, and, in an area just below the examination ID, imaging information corresponding to the examination ID is displayed. The imaging information is received from the RIS 12 as mentioned above. In the case of an example illustrated in FIG. 5B, imaging method buttons 109 (a front chest button 109a and a lateral chest button 109b) corresponding to the imaging information are arranged. In response to the imaging information input button 106 being pressed, an imaging information input area 108 such as that illustrated in FIG. 5C is displayed, so that the operator can also add a further imaging method. In the example illustrated in FIG. 5C, a plurality of imaging method selection buttons 114 is displayed in the imaging information input area 108, so that the operator can make a selection from the plurality of imaging method selection buttons 114 to add a further imaging method. The added imaging method is displayed in the imaging information display area 105 side by side with the front chest button 109a and the lateral chest button 109b. Each imaging method is associated with an imaging method ID.

The operator confirms the patient information and the imaging information and then presses the examination start button 107. With this operation, an examination to be performed is fixed. In response to the examination start button 107 being pressed, the radiographic imaging apparatus 1 displays an imaging screen such as that illustrated in FIG. 6 on the display unit 2. The imaging screen is a screen which is used during imaging.

Figure 6:
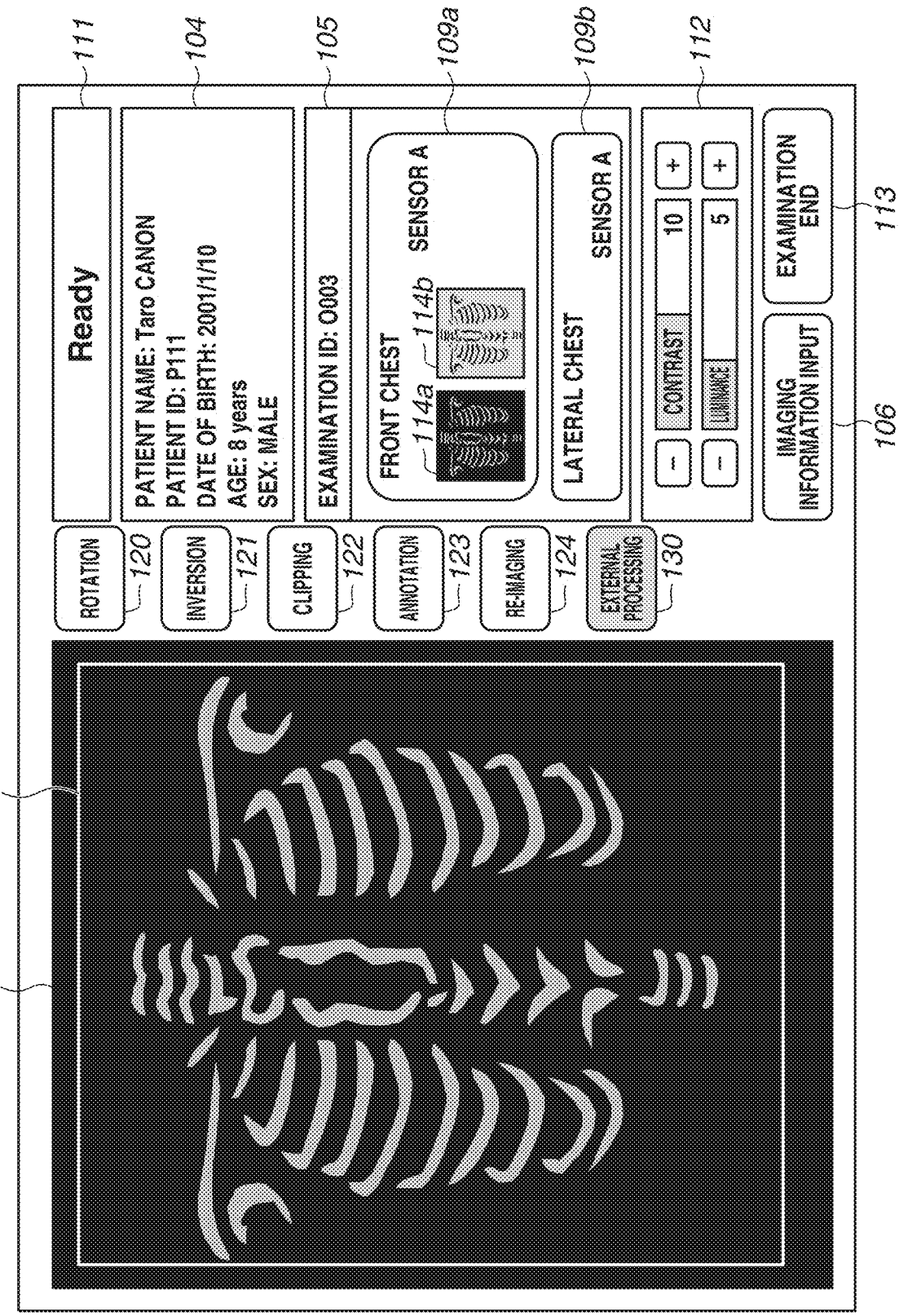
FIG. 6 is a diagram illustrating an example of an imaging screen which is displayed on the display unit illustrated in FIG. 1 in the first exemplary embodiment.

The imaging screen is basically configured to include display areas similar to those of the new examination input screen described with reference to FIGS. 5A to 5C. Newly additional display areas include, as illustrated in FIG. 6, an image display area 110, a message area 111, an image processing setting area 112, and an examination end button 113.

When the imaging screen is displayed, the imaging method button 109a, which is arranged at the uppermost portion in the imaging information display area 105, is in a selected state by default. Along with this, the control unit 5 of the radiographic imaging apparatus 1 transmits an imaging condition (for example, a tube voltage, a tube current, and an irradiation time) set in association with such imaging method button (imaging method) to the radiation generation apparatus control unit 4. Then, the control unit 5 prepares for imaging by controlling the radiation detector 7 according to the imaging condition.

Upon completion of the preparation, the radiographic imaging apparatus 1 transitions to an imaging ready state. At this time, in the message area 111, a "Ready" message indicating the imaging ready state is displayed.

Next, the operator confirms the imaging method and performs setting of imaging and positioning of a patient. Upon completion of a series of imaging preparations, the operator refers to the message area 111 and confirms that the radiographic imaging apparatus 1 is in the imaging ready state, and then presses a radiation irradiation switch (not illustrated). Then, the radiographic imaging apparatus 1 causes the radiation generation unit 8 to radiate radiation toward a subject (a specific region of the patient) and then causes the radiation detector 7 to detect radiation transmitted through the subject. This causes image capturing of a radiographic image to be performed.

Upon completion of the imaging, the control unit 5 of the radiographic imaging apparatus 1 acquires a captured image from the radiation detector 7 and performs image processing on the acquired captured image based on a predetermined image processing condition. The predetermined image processing condition is previously defined in conformity with the imaging method.

Upon completion of the image processing, the radiographic imaging apparatus 1 displays the captured image subjected to the image processing in the image display area 110. Moreover, the radiographic imaging apparatus 1 creates a thumbnail 114 in the imaging method button 109.

When wanting to change, for example, the contrast of the captured image, the operator operates a button for, for example, contrast or luminance provided in the image processing setting area 112.

Similarly, when wanting to change a clipping area of the output image, the operator operates, for example, a clipping button 122 and a clipping frame 126, thus designating a desired clipping area. In the case of appending a character string serving as diagnosis information, the operator operates, for example, an annotation button 123 and superposes an annotation character string on the image. In a case where the direction of an image is not suitable for diagnosis, the operator performs geometric transform with use of, for example, a rotation button 120 or an inversion button 121. In the above-described way, the operator is able to perform additional image editing on a captured image displayed in the image display area 110.

When wanting to utilize image processing to be performed by the external processing apparatus 17, the operator presses an external processing button 130. In the imaging method, information as to whether previously make external processing available and a request destination for external processing and the content of external processing in the case of external processing being made available are set. Alternatively, the operator can perform setting as to whether to enable the control unit 5 to transmit a medical image to an external processing system. In a case where there is a plurality of external processing systems, the operator can perform setting as to whether to make transmission of a medical image available for each of the plurality of external processing systems or can perform setting as to whether to make transmission of a medical image available collectively for the plurality of external processing systems. For example, in a case where an image corresponding to the front chest button 109a is being displayed in the image display area 110, the external processing button 130 is enabled according to setting as to whether to make external processing of the imaging method corresponding to the front chest button 109a available.

In response to the external processing button 130 being pressed, the radiographic imaging apparatus 1 transmits a radiographic image which is being displayed in the image display area 110 to the external processing apparatus 17. Thus, in a case where transmission of a medical image has been made available, the radiographic imaging apparatus 1 is able to transmit an image serving as a processing object to an external processing system. In a case where there is a plurality of external processing systems, the radiographic imaging apparatus 1 transmits a medical image to an external processing system which is previously set in such a manner as to receive a processing request out of the plurality of external processing systems. To a radiographic image to be transmitted, for example, an image ID for discriminating the radiographic image itself, a series ID, an examination ID, and a series No. and irradiation time serving as information about the examination are appended.

Imaging information is included in an examination order received from the RIS 12. Designating an imaging method in which external processing is made available also enables employing a configuration in which the HIS 11 or the RIS 12 requests image generation to be performed by external processing.

Upon receiving a processed image from the external processing apparatus 17, the radiographic imaging apparatus 1 identifies image information about a captured image serving as an original of the processed image based on information appended to the processed image. Then, the radiographic imaging apparatus 1 performs association between image information about the captured image and appended information about the processed image with use of image information corresponding to a processing source. Alternatively, the radiographic imaging apparatus 1 can receive image information via a communication different from a communication for reception of the processed image. The associated processed image is displayed as a thumbnail in the same imaging method button 109a as that used for the captured image.

When the imaging method button 109b is designated as next imaging, the control unit 5 prepares for imaging by controlling the radiation detector 7 according to the corresponding imaging condition. Alternatively, the radiographic imaging apparatus 1 can determine that, in response to the imaging method button 109b being designated and irradiation of radiation being performed, image confirmation in imaging for the imaging method button 109a has been completed.

The operator repeats the above-described procedure to perform imaging in all of the imaging methods displayed in the imaging information display area 105. Upon completion of imaging in all of the imaging methods, the operator presses the examination end button 113. With this operation, a series of examination operations ends. The radiographic imaging apparatus 1 causes the control unit 5 to append, to images, for example, the examination information and imaging condition about those as appended information and output an image object to, for example, the PACS 13, the printer 14, or a ROM included in the radiographic imaging apparatus 1 itself. The radiographic imaging apparatus 1 transmits examination execution information, which is a notification of ending of the examination, to the HIS 11. The radiographic imaging apparatus 1 causes an identifier of the processed image received until the ending of the examination to be included in the examination execution information as an object included in the examination. The radiographic imaging apparatus 1 displays a new examination input screen again.

<Registration Processing of Processed Image>

Figure 7:
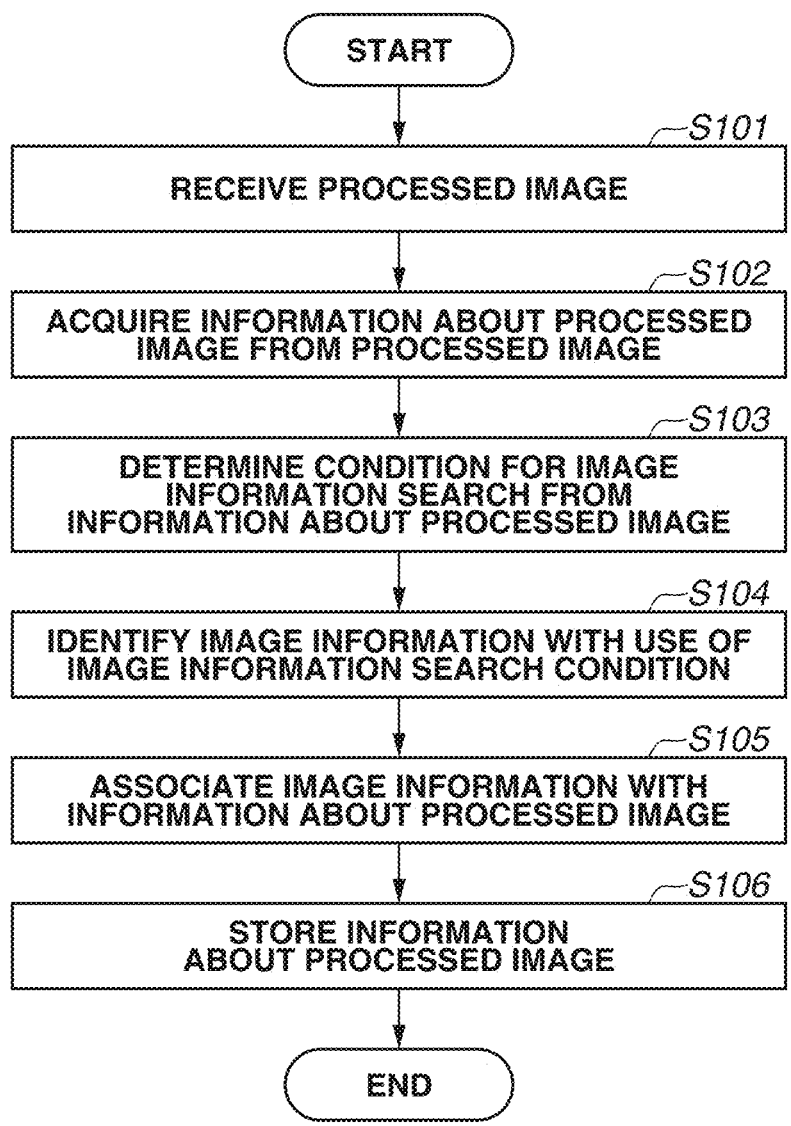
FIG. 7 is a flowchart illustrating an example of a processing procedure of registration processing for a processed image as a medical information processing method which is performed by the radiographic imaging apparatus according to the first exemplary embodiment.
Figure 8:
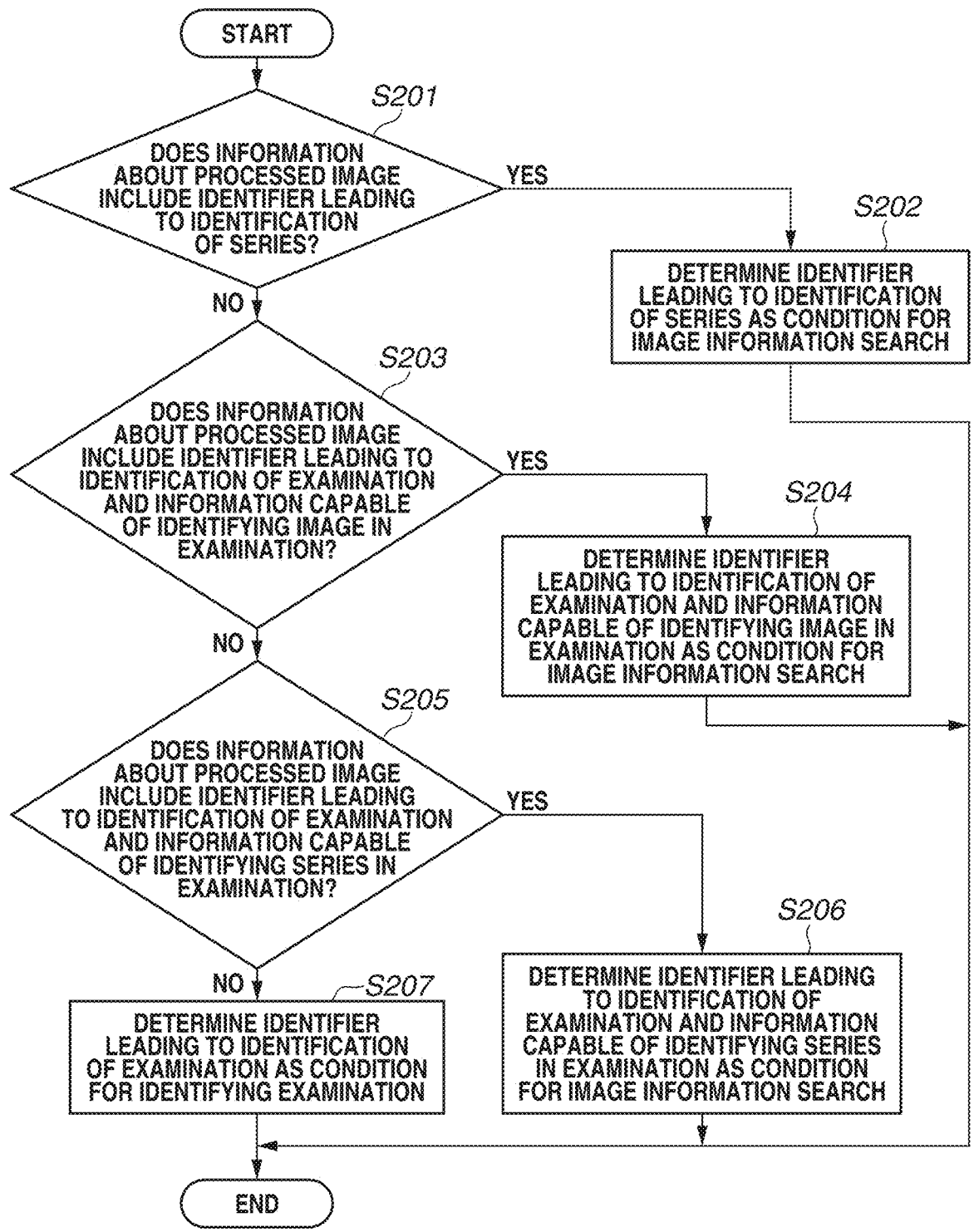
FIG. 8 is a flowchart illustrating an example of a processing procedure of search condition determination processing for determining a condition for identifying a series of image information having served as an original of a processed image as a medical information processing method which is performed by the radiographic imaging apparatus according to the first exemplary embodiment and a third exemplary embodiment of the present disclosure.

FIG. 7 is a flowchart illustrating an example of a processing procedure of processed image registration processing as a medical information processing method which the control unit 5 of the radiographic imaging apparatus 1 in the first exemplary embodiment performs. Moreover, FIG. 8 is a flowchart illustrating step S103 illustrated in FIG. 7 in detail. The following description is made with reference to an imaging screen illustrated in FIG. 6. First, when the operator presses the external processing button 130, the control unit 5 outputs an image object which is being displayed to an external system. Next, when processing is completed by the external system, in step S101, the input and output unit 27 receives a generated processed image. In step S102, the information acquisition unit 28 acquires, from the received processed image, information appended to the processed image. In step S103, the search condition determination unit 29 determines a condition for image information search (a search condition) from the acquired appended information about the processed image. Specifically, if the acquired appended information about the processed image includes an identifier leading to identification of a series (an original image ID and a series No.) such as that shown in the table 51 (YES in step S201), then in step S202, the search condition determination unit 29 determines the identifier leading to identification of a series as a search condition. Thus, in a case where the appended information includes a series identifier for discriminating a series to which the image belongs, it is possible to search for an original image with use of the series identifier included in the appended information from the storage unit and associate the appended information about the image and the image information about the original image with each other.

If the acquired appended information about the processed image does not include an identifier leading to identification of a series (NO in step S201) but includes an identifier leading to identification of an examination (an examination ID) and information capable of identifying an image in the examination (irradiation time) such as that shown in the table 52 (YES in step S203), then in step S204, the search condition determination unit 29 determines the identifier leading to identification of an examination and the information capable of identifying an image in the examination as a search condition.

If the acquired appended information about the processed image does not include an identifier leading to identification of an examination and information capable of identifying an image in the examination (NO in step S203) but includes an identifier leading to identification of an examination (an examination ID) and information capable of identifying a series in the examination (a series No.) such as that shown in the table 53 (YES in step S205), then in step S206, the search condition determination unit 29 determines the identifier leading to identification of an examination and the information capable of identifying a series in the examination as a search condition. Thus, in a case where the appended information does not include a series identifier for identifying a series to which the image belongs, it is possible to search for an original image with use of information other than the series identifier included in the appended information and associate the appended information and the image information about the original image with each other. Particularly, it is possible to search for an original image with use of an examination identifier for discriminating an examination in which an image has been captured and information capable of identifying an image in the examination or with use of the examination identifier and information capable of identifying a series in the examination and associate the appended information about the processed image and the image information about the original image with each other. A case where the acquired appended information about the processed image does not include an identifier leading to identification of an examination and information capable of identifying a series in the examination (NO in step S205) is described in a third exemplary embodiment described below.

In step S104, the image information identification unit 30 identifies image information about the captured image serving as an original image of the processed image from the image table with use of the determined search condition. Next, in step S105, the examination management unit 24 performs association by setting a series ID of the appended information about the processed image as a series ID of the identified image information. In step S106, the examination management unit 24 stores the appended information about the processed image associated with the image information.

With this processing, the processed image and the captured image are automatically associated with each other on a series-by-series basis, so that association by a manual operation becomes not required. Moreover, even in a case where an identifier for identifying a series is not appended to the processed image, it becomes possible to associate the processed image with a series.

While, in the above-described exemplary embodiment, association is implemented by acquiring information about the processed image and associating the acquired information with image information about a captured image serving as an original of the processed image, associating image information about the captured image with the processed image itself can be employed.

Moreover, whichever of the determinations in step S203 and step S205 can be performed first.

Moreover, while a radiographic image has been described as an example, not only that, for example, a long partial image, a long composite image, an energy subtraction image, or a moving image can be employed.

According to the above-described configuration, association between a captured image and a processed image is performed not by an external system but automatically. Therefore, there occurs no errors in the association performed by an operator's manual operation and changing of the specifications for every external system becomes unnecessary, so that it is possible to efficiently perform an operation.

Next, a second exemplary embodiment of the present disclosure is described. Furthermore, in the following description of the second exemplary embodiment, particulars common to those in the above-described first exemplary embodiment are omitted from description and particulars different from those in the above-described first exemplary embodiment are described.

<Registration Processing of Processed Image>

While, in the first exemplary embodiment, association is performed by setting a series ID of information about the processed image as a series ID of the identified image information, association can be performed by using an image ID. For example, while, in a case where a plurality of captured images is included in one series, performing association by using a series does not enable determining a captured image serving as an original of the processed image, performing association by using an image ID enables determining a captured image serving as an original of the processed image.

To perform association by using an image ID, it is necessary to identify an ID of image information about the captured image serving as an original of the processed image.

Figure 9:
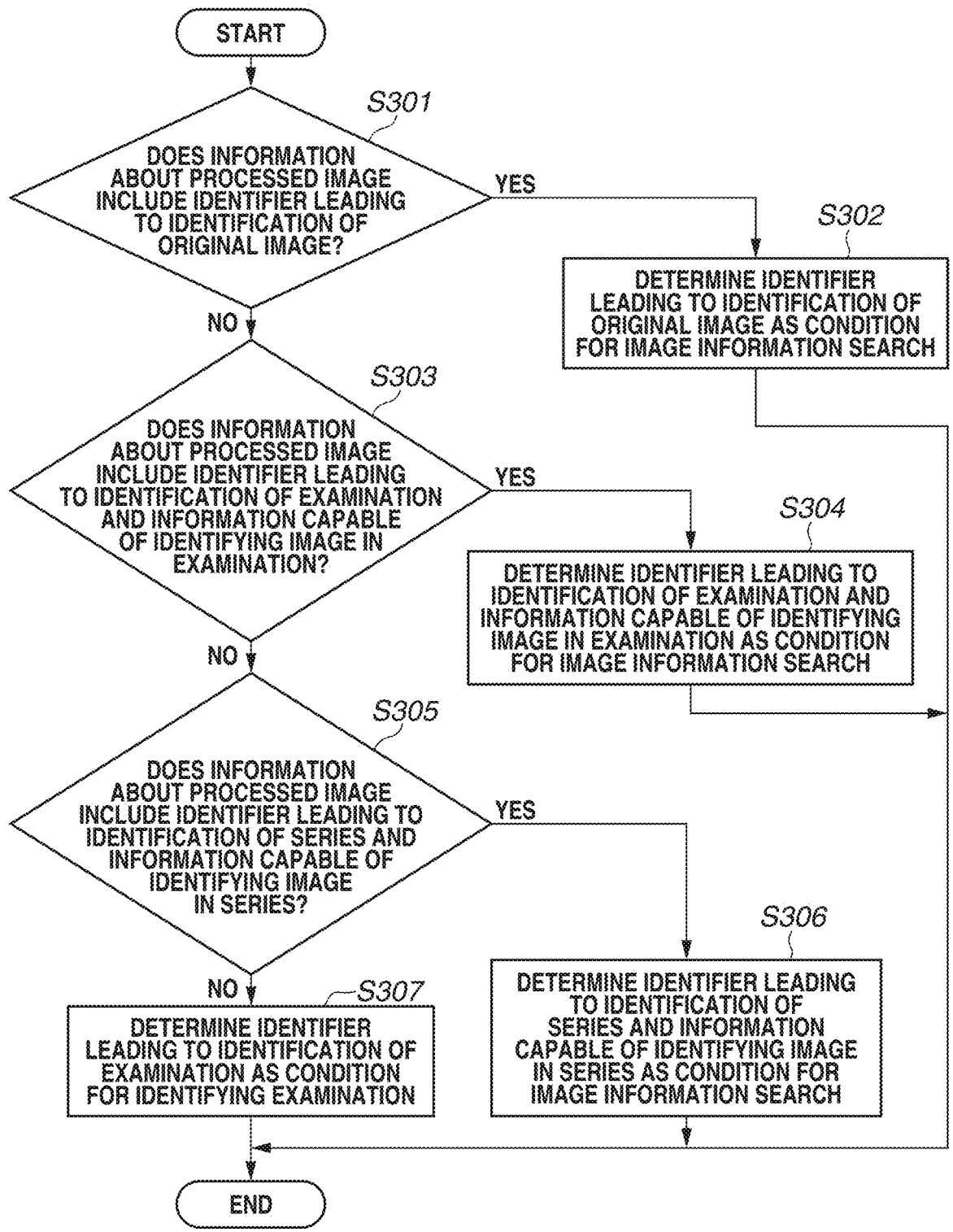
FIG. 9 is a flowchart illustrating an example of a processing procedure of search condition determination processing for determining a condition for identifying an image of image information having served as an original of a processed image as a medical information processing method which is performed by the radiographic imaging apparatus according to a second exemplary embodiment of the present disclosure and the third exemplary embodiment.

FIG. 9 is a flowchart illustrating processing for determining, from information about a processed image, a search condition for identifying an ID of information about a captured image serving as an original of the processed image.

If the acquired appended information about the processed image includes an identifier leading to identification of a captured image serving as an original of the processed image (an original image ID) (YES in step S301), then in step S302, the search condition determination unit 29 determines the identifier leading to identification of a captured image serving as an original of the processed image as a search condition.

If the acquired appended information about the processed image does not include an identifier leading to identification of a captured image serving as an original of the processed image (NO in step S301) but includes an identifier leading to identification of an examination and information capable of identifying an image in the examination (YES in step S303), then in step S304, the search condition determination unit 29 determines the identifier leading to identification of an examination and the information capable of identifying an image in the examination as a search condition. Thus, in a case where the appended information includes an image identifier for identifying an image, it is possible to search for an original image with use of the image identifier included in the appended information from the storage unit and associate the appended information about the image and the image information about the original image with each other.

Figure 10:
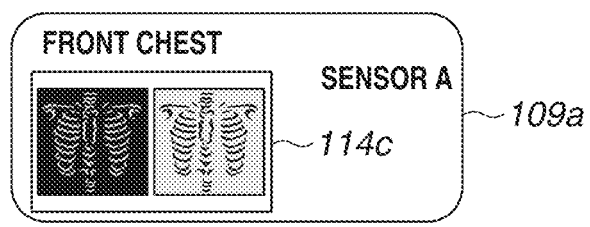
FIG. 10 is a diagram illustrating an example of an imaging method button which is displayed in an imaging information display area illustrated in FIG. 6 in the second exemplary embodiment.

If the acquired appended information about the processed image does not include an identifier leading to identification of an examination and information capable of identifying an image in the examination (NO in step S303) but includes an identifier leading to identification of a series and information capable of identifying an image in the series (YES in step S305), then in step S306, the search condition determination unit 29 determines the identifier leading to identification of a series and the information capable of identifying an image in the series as a search condition. Thus, in a case where the appended information does not include an image identifier for identifying an image, it is possible to search for an original image with use of information other than the image identifier included in the appended information and associate the appended information and the image information about the original image with each other. Particularly, it is possible to search for an original image with use of a series identifier for discriminating a series to which an image belongs and information capable of identifying an image in the series or with use of an examination identifier for discriminating an examination in which an image has been captured and information capable of identifying an image in the examination and associate the appended information about the processed image and the image information about the original image with each other. A case where the acquired appended information about the processed image does not include an identifier leading to identification of a series and information capable of identifying an image in the series (NO in step S305) is described in a third exemplary embodiment described below. In step S104 (FIG. 7), the image information identification unit 30 identifies image information from the image table with use of the determined search condition as a key. Next, in step S105 (FIG. 7), the examination management unit 24 performs association by setting an original image ID of the appended information about the processed image as an image ID of the identified image information about the captured image. In step S106 (FIG. 7), the examination management unit 24 stores the appended information about the processed image associated with the image information about the captured image. The associated processed image is grouped with the captured image and is displayed as a thumbnail in a frame 114c of the imaging method button 109a as illustrated in FIG. 10.

With this processing, the processed image and the captured image are automatically associated with each other on an image-by-image basis, so that association by a manual operation becomes not required. Moreover, even in a case where an identifier for identifying an image is not appended to the processed image, it becomes possible to associate the processed image with a captured image.

While, in the above-described exemplary embodiment, association is implemented by acquiring information about the processed image and associating the acquired information with image information about a captured image serving as an original of the processed image, associating the image information with the processed image itself can be employed.

Moreover, whichever of the determinations in step S303 and step S305 can be performed first.

Next, a third exemplary embodiment of the present disclosure is described. Furthermore, in the following description of the third exemplary embodiment, particulars common to those in the above-described first exemplary embodiment and second exemplary embodiment are omitted from description and particulars different from those in the above-described first exemplary embodiment and second exemplary embodiment are described.

<Registration Processing of Processed Image>

While, in the above-described first or second exemplary embodiment, a search condition for identifying a series or image of image information about a captured image serving as an original of the processed image is determined, in a case where such a search condition is not able to be determined (NO in step S205 illustrated in FIG. 8 or NO in step S305 illustrated in FIG. 9), then in step S207 or step S307, the search condition determination unit 29 determines the identifier leading to identification of an examination as a condition for identifying an examination.

Figure 12:
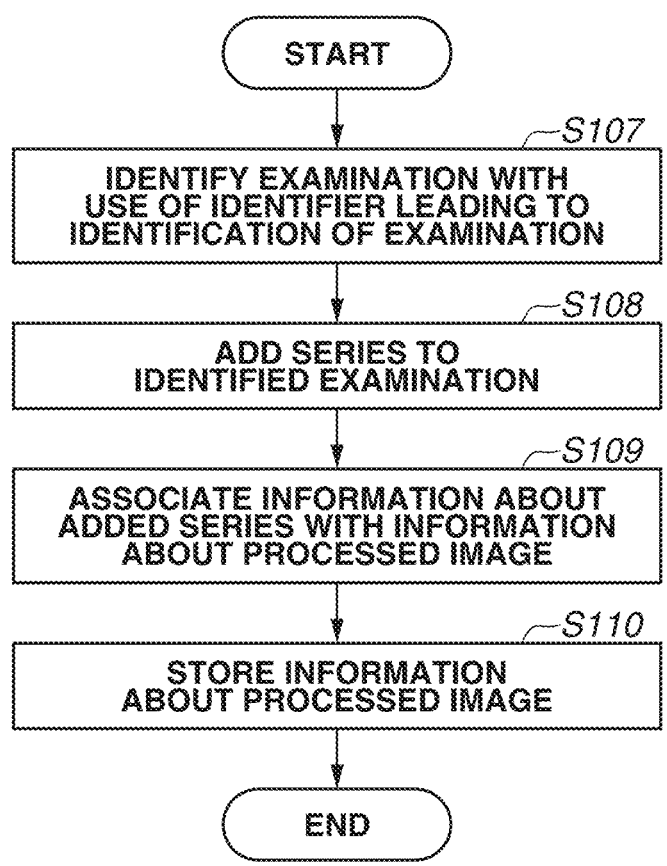
FIG. 12 is a flowchart illustrating an example of a procedure for adding a series to image information having served as an original of a processed image and associating the processed image with the added series as a medical information processing method which is performed by the radiographic imaging apparatus according to the third exemplary embodiment.

FIG. 12 is a flowchart of processing which is performed after the above-mentioned step S207 or step S307 is performed.

Figure 11:
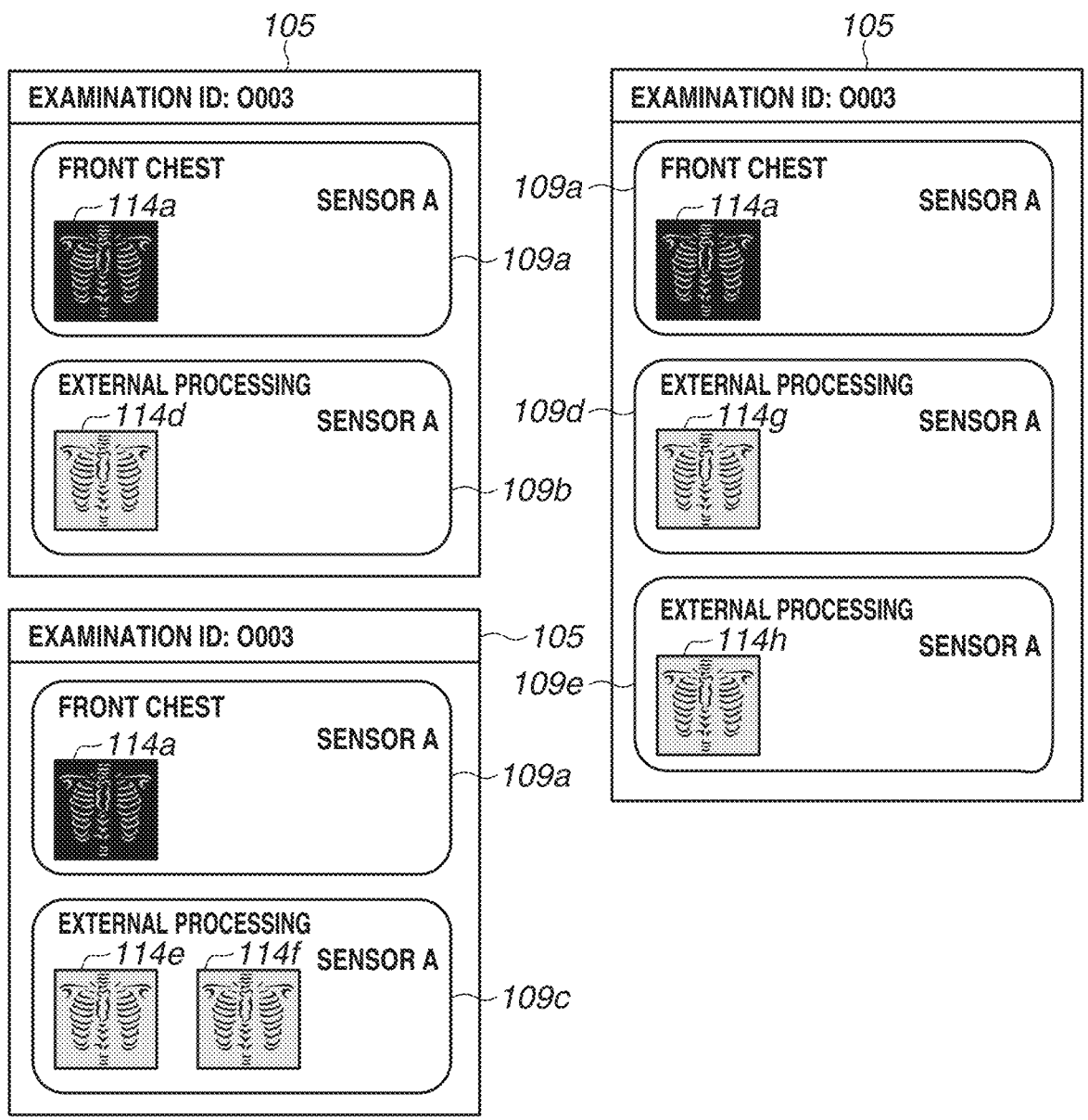
FIG. 11 is a diagram illustrating examples of an imaging method button which is displayed in the imaging information display area illustrated in FIG. 6 in the third exemplary embodiment.

In step S107, the search condition determination unit 29 identifies an examination from the image table with the search condition determined in step S207 or step S307 set as a key. Next, in step S108, the examination management unit 24 add a series to the identified examination. Thus, the examination management unit 24 is equivalent to an example of a series addition unit which adds a series to which an image belongs. A series ID to be added is newly assigned a number, and then in step S109, the examination management unit 24 performs association by setting a series ID of the appended information about the processed image as an ID of the series added in step S108. Thus, in a case where the appended information does not include information capable of identifying an image in an examination or information capable of identifying a series in an examination, which is combined with an examination identifier for discriminating an examination in which an image has been captured, the examination management unit 24 is able to search for an examination with use of the examination identifier, adds a series to an examination extracted by searching, and associate the added series and the appended information about the processed image with each other. Moreover, in a case where the appended information does not include information capable of identifying an image in an examination or a series identifier for discriminating a series to which an image belongs and information capable of identifying an image in the series, which is combined with an examination identifier for discriminating an examination in which an image has been captured, the examination management unit 24 is able to search for an examination with use of the examination identifier, add a series to the examination extracted by searching, and associate the added series and the appended information about the processed image with each other. In step S110, the examination management unit 24 stores the associated appended information about the processed image. The associated processed image is displayed as a thumbnail in a frame 114d of the imaging method button 109b, which is added separately from that for the captured image, as illustrated in FIG. 11. Information such as a name and a type of sensor which is displayed in an imaging method button can be the one which is previously set by the operator or the one which is automatically generated by the radiographic imaging system. Moreover, in a case where there is a plurality of processed images, the number of series to be added in step S108 can be set on an image-by-image basis. In that case, the associated processed images are displayed as thumbnails in frames 114g and 114h of the imaging method buttons 109d and 109e, as illustrated in FIG. 11, in the respective series added on an image-by-image basis. Moreover, similarly, in a case where there is a plurality of processed images, the number of series to be added in step S108 can be set to one. In that case, the associated processed images are displayed as thumbnails in frames 114e and 114f of the imaging method button 109c, as illustrated in FIG. 11, in the added series.

With this processing, the processed image and the captured image are automatically associated with each other on a series-by-series basis, so that association by a manual operation becomes not required. Moreover, even in a case where a series to which the captured image serving as an original of the processed image belongs or a captured image itself has not been able to be identified, it is possible to associate the processed image with a series in the examination.

Next, a fourth exemplary embodiment of the present disclosure is described. Furthermore, in the following description of the fourth exemplary embodiment, particulars common to those in the above-described first exemplary embodiment are omitted from description and particulars different from those in the above-described first exemplary embodiment are described.

While, in the first exemplary embodiment, association is performed by identifying, from information appended to a processed image, image information about a captured image serving as an original of the processed image, at the time of reception of a processed image, association with image information about a captured image most recently transmitted and not yet completely associated can be performed. Thus, it is possible to associate image information about a medical image most recently transmitted to an external system and not yet completely associated with a processed image subjected to processing in the external system and appended information about the processed image with each other.

Figure 13:
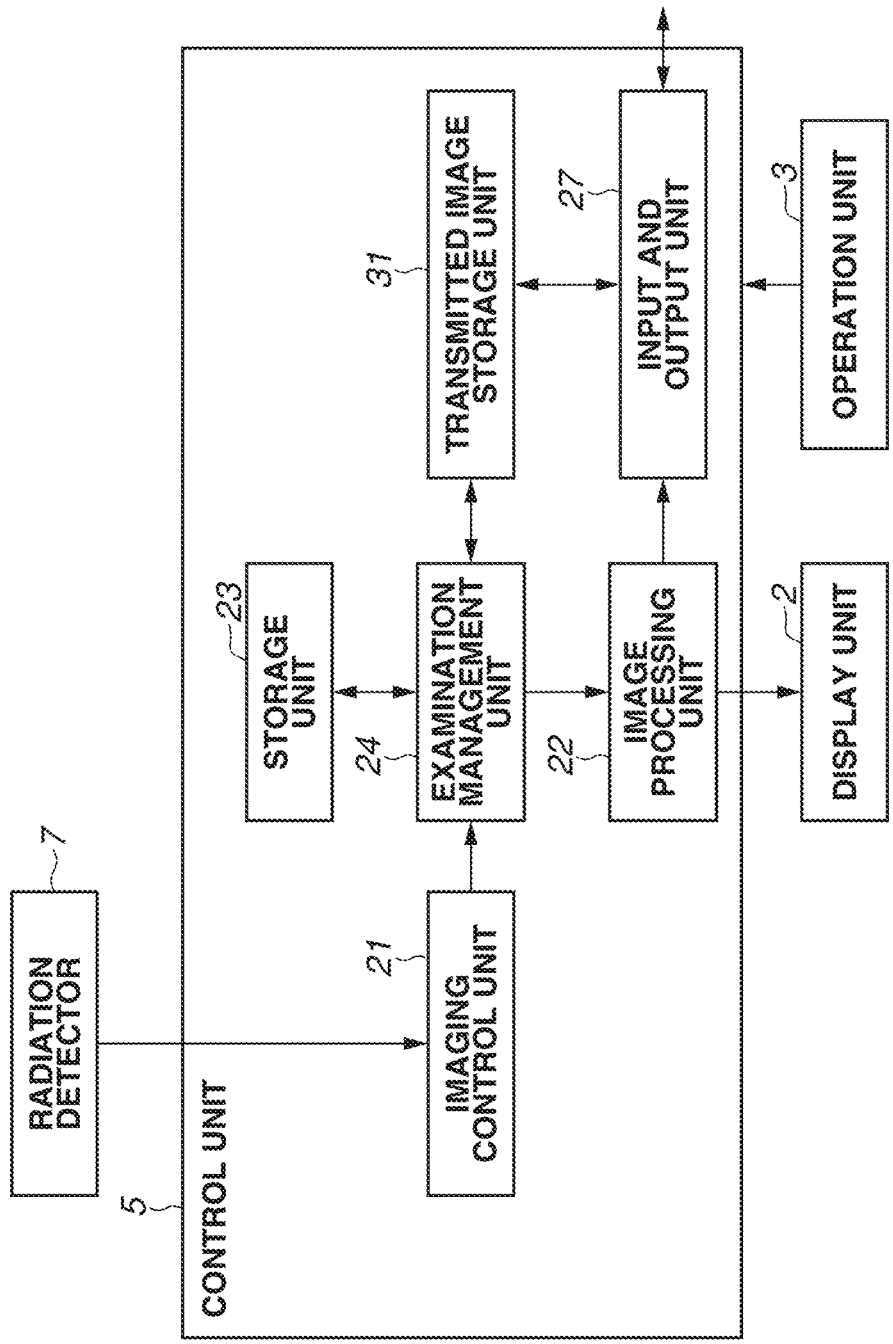
FIG. 13 is a diagram illustrating an example of an outline configuration of the overall control unit illustrated in FIG. 1 in a fourth exemplary embodiment of the present disclosure.

A transmitted image storage unit 31 illustrated in FIG. 13 stores the same captured image as a captured image which has been transmitted from the input and output unit 27 to the external processing apparatus 17. When the input and output unit 27 receives a processed image, the captured image stored in the transmitted image storage unit 31 is associated with the received processed image by the examination management unit 24. The method of association can be the one described in the first exemplary embodiment or the second exemplary embodiment. The associated processed image is then stored in the storage unit 23.

With this processing, the processed image and the captured image are automatically associated with each other, so that association by a manual operation becomes not required. Moreover, in a communication with an external system which is configured not to append information to a processed image, it becomes possible to perform association of image information.

Next, a fifth exemplary embodiment of the present disclosure is described. Furthermore, in the following description of the fifth exemplary embodiment, particulars common to those in the above-described first exemplary embodiment are omitted from description and particulars different from those in the above-described first exemplary embodiment are described.

In the above-described first exemplary embodiment, an image ID appended to a processed image is an ID specific to each image. If the image ID appended to a processed image is an image ID of image information about a captured image serving as an original of the processed image, it may become impossible to recognize that the processed image and the image information about a captured image serving as an original of the processed image are respective different images. In a case where an image ID appended to the received processed image is the one already stored in the storage unit 23, the examination management unit 24 changes the image ID appended to the received processed image to a specific value. Thus, the examination management unit 24 is equivalent to a changing unit which, in a case where an image ID equal to an image ID included in appended information about a processed image is already stored in a storage unit, changes the image ID included in the appended information to a specific value. Even in a case where no image ID has not been appended to a processed image, the examination management unit 24 performs similar processing.

Alternatively, when transmitting a captured image to an external processing system, the examination management unit 24 duplicates the captured image and changes an image ID of a duplicate of the captured image to a specific value. The examination management unit 24 can transmit a duplicate of the captured image to an external processing system, thus avoiding overlapping of an image ID. Thus, the examination management unit 24 can transmit a duplicated image an image ID of which has been changed to a value different from the image ID of a duplication source.

With this processing, even in a communication with an external system which is configured not to change information appended to a processed image, it becomes possible to perform association of image information.

Next, a sixth exemplary embodiment of the present disclosure is described. Furthermore, in the following description of the sixth exemplary embodiment, particulars common to those in the above-described exemplary embodiments are omitted from description and particulars different from those in the above-described exemplary embodiments are described. In the sixth exemplary embodiment, the control unit 5 is configured to display a thumbnail of the processed image in a display form different from that for a thumbnail of the original image in such a way as to enable discriminating that the processed image is an image processed by the external system. This configuration is described in detail with reference to the drawings.

Figure 2:
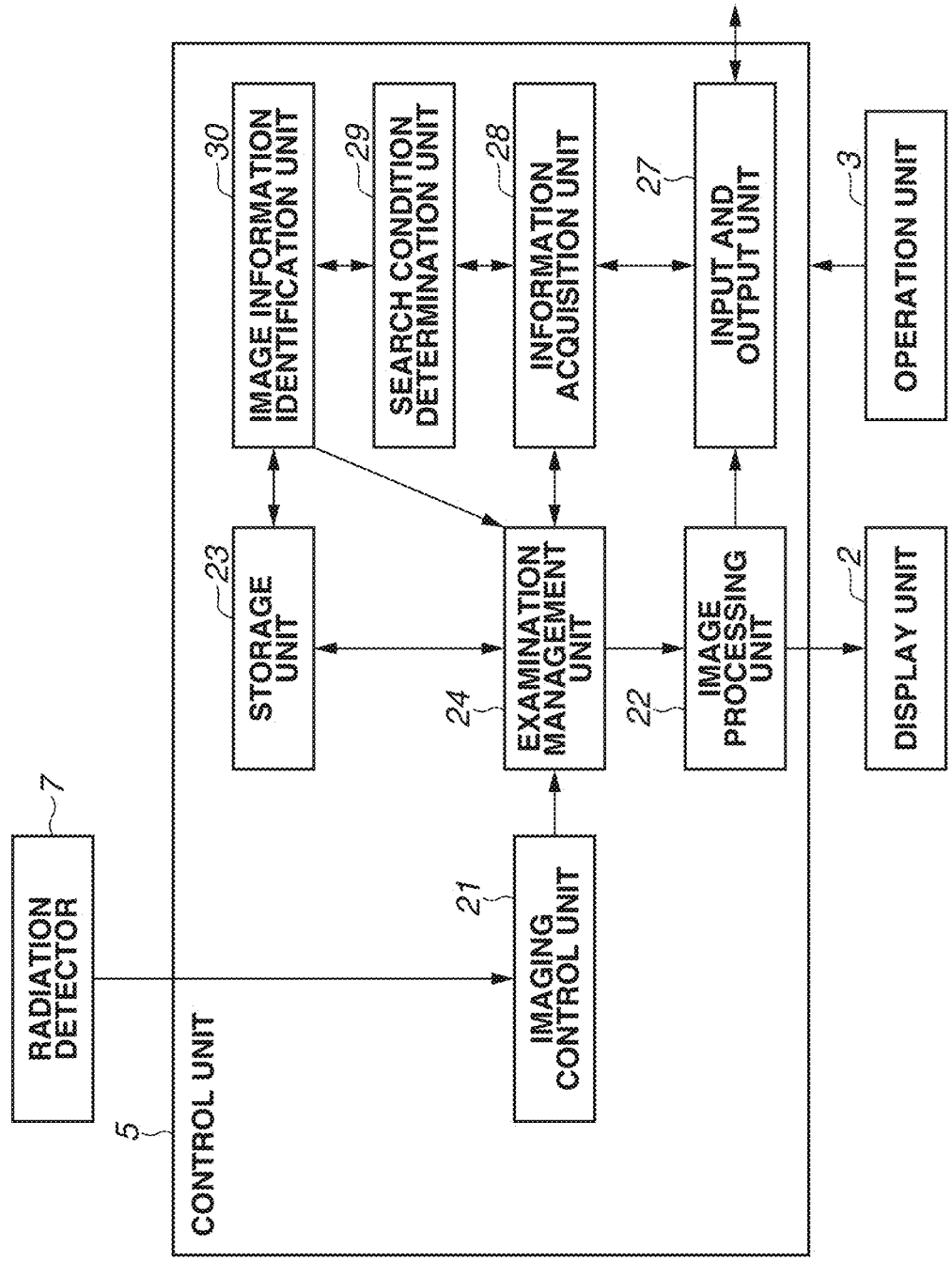
FIG. 2 is a diagram illustrating an example of an outline configuration of an overall control unit illustrated in FIG. 1.

FIG. 14 is a diagram illustrating examples of an imaging method table and an external processing table stored in the storage unit 23 illustrated in FIG. 2. The imaging method table illustrated in FIG. 14 is a table which appends an imaging method ID to each imaging method and stores setting values for, for example, a name of each imaging method and information indicating whether external processing is available.

The external processing table illustrated in FIG. 14 is a table which appends an external processing ID to each piece of external processing and associates the external processing ID and an imaging method identified by the imaging method ID with each other.

FIG. 15 is a diagram illustrating an example of an image table which stores a captured image, a processed image generated by the external system, and image information about them. The image table stores an ID of each image, a series ID, an imaging method ID, a source of an image, and, in the case of a processed image, a processing content performed by the external system.

As with the above-described exemplary embodiments, the operator confirms the patient information and the imaging information and then presses the examination start button 107 (see FIGS. 5A to 5C). With this operation, an examination to be performed is fixed. In response to the examination start button 107 being pressed, the radiographic imaging apparatus 1 displays an imaging screen such as that illustrated in FIG. 16 on the display unit 2. The imaging screen is a screen which is used during imaging.

Figure 16:
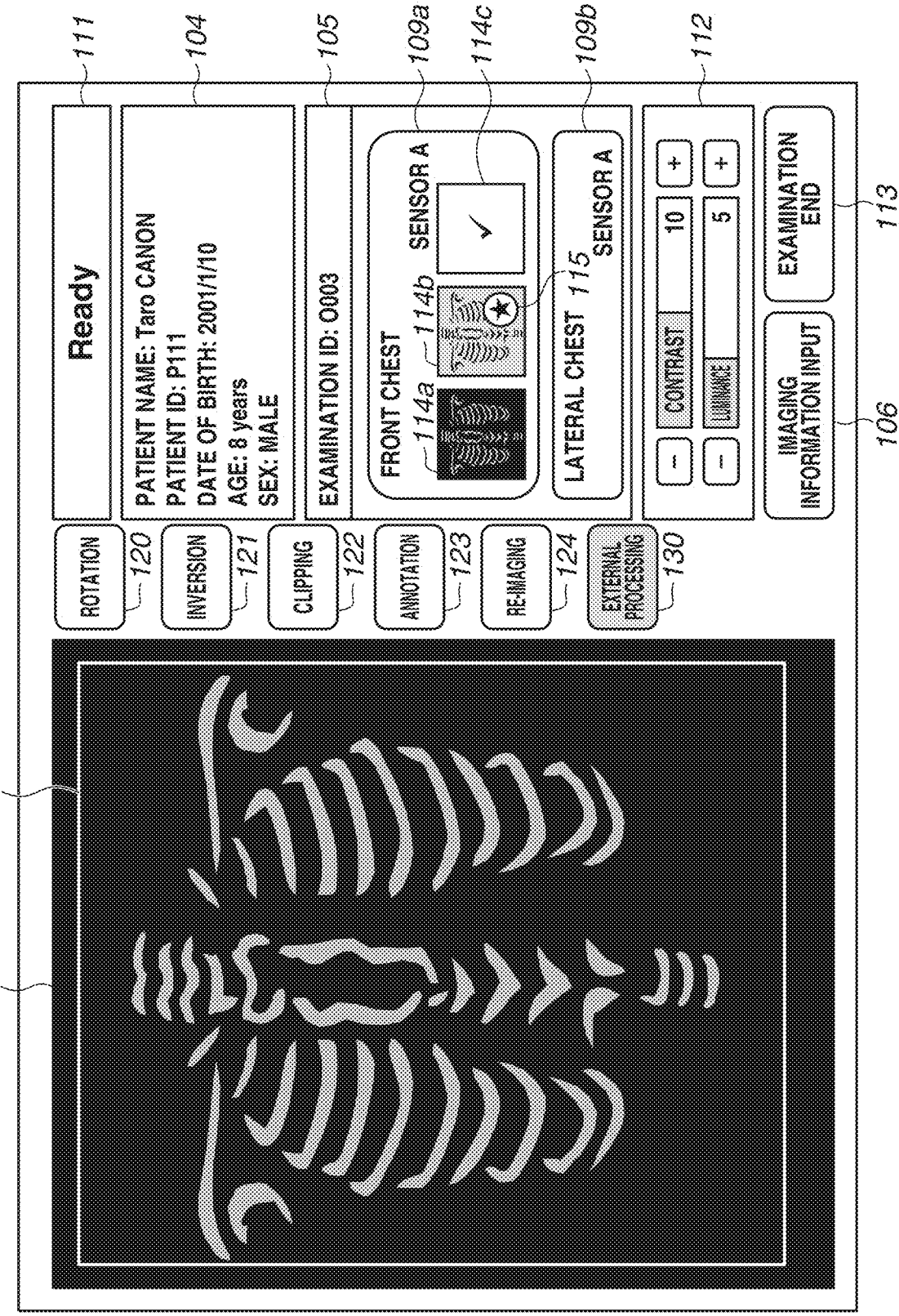
FIG. 16 is a diagram illustrating an example of an imaging screen which is displayed on the display unit illustrated in FIG. 1 in the sixth exemplary embodiment.

In response to the external processing button 130 illustrated in FIG. 16 being pressed, the radiographic imaging apparatus 1 transmits a radiographic image which is being displayed in the image display area 110 to the external processing apparatus 17. Thus, in a case where transmission of a medical image has been made available, the radiographic imaging apparatus 1 is able to transmit an image serving as a processing object to an external processing system. In a case where there is a plurality of external processing systems, the radiographic imaging apparatus 1 transmits a medical image to an external processing system which is previously set in such a manner as to receive a processing request out of the plurality of external processing systems. The external processing apparatus 17, which serves as a transmission destination, is determined according to a request destination set in an imaging method corresponding to the front chest button 109a. To a radiographic image to be transmitted, an image ID for discriminating the radiographic image itself and information indicating a processing content to be performed by the external processing apparatus 17 are appended. Thus, the radiographic imaging apparatus 1 appends, to a medical image, information about the processing content to be performed on the medical image and transmits the medical image with the information appended thereto, and processing is performed on the medical image by the external processing system based on the transmitted processing content. In an operation in which image processing by the external processing apparatus 17 is used, the radiographic imaging apparatus 1 can be configured to perform transmission in response to a captured image being generated by imaging without the external processing button 130 being pressed by the operator. Thus, at timing when an original image serving as a target for processing in the external processing system has been generated, the radiographic imaging apparatus 1 can transmit the original image to the external processing system, or, upon receiving the external processing button 130 being pressed, the radiographic imaging apparatus 1 can transmit the original image to the external processing system. In the imaging method button 109, information indicating that the processing request has been performed is displayed as, for example, a thumbnail 114c.

The examination order received by the RIS 12 includes imaging information. A configuration in which, in response to an imaging method in which external processing is made available being designated, image generation by external processing is requested from the HIS 11 or the RIS 12 can also be employed.

Upon receiving a processed image from the external processing apparatus 17, the radiographic imaging apparatus 1 performs association between the processed image and the captured image with use of a captured image ID equivalent to a processing source appended to the processed image. Thus, the examination management unit 24 is able to search for an original image of the processed image by using appended information about the processed image as association information for associating the original image and the processed image with each other and associate the extracted original image and the processed image with each other. Alternatively, the radiographic imaging apparatus 1 can be configured to receive information related to the processed image, such as a captured image ID, in a communication different from that for reception of the processed image. Thus, the examination management unit 24 is able to search for an original image of the processed image with use of association information about the processed image transmitted in a communication different from that for the processed image and associate the extracted original image and the processed image with each other. The associated processed image is displayed as a thumbnail in the imaging method button 109a in which the captured image is also displayed as a thumbnail. Thus, the control unit 5 is equivalent to an example of a display control unit which displays, on a display unit, a thumbnail of the original image and a thumbnail of the processed image based on association between them. Moreover, the control unit 5 is equivalent to an example of a display control unit which displays a thumbnail of the original image and a thumbnail of the processed image in superimposition on an object indicating an imaging protocol used for capturing the original image. The control unit 5 changes a form in which, at the time of a processing request, the processing request has been performed as indicated by the thumbnail 114c to a form in which a reduced image is displayed as indicated by a thumbnail 114b. On the thumbnail, an icon enabling recognizing that the corresponding image is a processed image generated by the external processing apparatus 17, an external processing apparatus which has performed processing, and the content of the performed processing is displayed. Thus, the control unit 5 is able to display a thumbnail of the processed image in a display form different from that for a thumbnail of the original image not yet subjected to processing in such a way as to enable discriminate that the processed image is an image processed by the external processing system. In response to the portion of the thumbnail being pressed, the control unit 5 displays the processed image in the image display area 110. If reprocessing by the radiographic imaging apparatus 1 is unnecessary on a processed image, the control unit 5 is able to disable an operation for processing or modifying an image, such as rotation 120, inversion 121, clipping 122, annotation 123, or an image processing setting area 112. Alternatively, if an instruction for image editing to a processed image is issued, the control unit 5 can perform warning display indicating that the processed image is an image limited in processing.

When the imaging method button 109b is designated as next imaging, the control unit 5 prepares for imaging by controlling the radiation detector 7 according to the corresponding imaging condition. Alternatively, the radiographic imaging apparatus 1 can determine that, in response to the imaging method button 109b being designated and irradiation of radiation being performed, image confirmation in imaging for the imaging method button 109a has been completed.

The operator repeats the above-described procedure to perform imaging in all of the imaging methods displayed in the imaging information display area 105. Upon completion of imaging in all of the imaging methods, the operator presses the examination end button 113. With this operation, a series of examination operations ends. The radiographic imaging apparatus 1 causes the control unit 5 to append, to images, for example, the examination information and imaging condition about those as appended information and output an image object to, for example, the PACS 13, the printer 14, or a ROM included in the radiographic imaging apparatus 1 itself. Here, with regard to processed images, whether to output a processed image to an image management server is able to be set in advance for each imaging method such as that shown in the imaging method table illustrated in FIG. 14, and the radiographic imaging apparatus 1 outputs a processed image obtained by an imaging method for which outputting to the image management server is enabled. Thus, the radiographic imaging apparatus 1 outputs a processed image to the image management server based on the setting as to whether to enable outputting of the processed image to the image management server. The radiographic imaging apparatus 1 transmits examination execution information, which is a notification of ending of the examination, to the HIS 11. The radiographic imaging apparatus 1 causes an identifier of the processed image received until the ending of the examination to be included in the examination execution information as an object included in the examination.

The radiographic imaging apparatus 1 displays a new examination input screen again.

There is conceivable a case where the radiographic imaging apparatus 1 receives a processed image from the external processing apparatus 17 after ending of the examination. In this case, first, the radiographic imaging apparatus 1 performs association as with the examination being in progress. Next, the radiographic imaging apparatus 1 outputs the received processed image according to the setting in the imaging method table as with ending of the examination. Thus, in a case where, at the time of acquisition of a processed image, an examination in which capturing of an original image of the processed image is included is not yet ended, the radiographic imaging apparatus 1 is able to output the processed image to the image management server in response to ending of the examination, and, in a case where, at the time of acquisition of a processed image, the examination is already ended, the radiographic imaging apparatus 1 is able to output the processed image to the image management server at timing of acquisition of the processed image. Alternatively, in a case where, at the time of acquisition of a processed image, an examination in which capturing of an original image of the processed image is included is being displayed on the display unit, the radiographic imaging apparatus 1 is able to output the processed image to the image management server based on an instruction for outputting the processed image, and, in a case where, at the time of acquisition of a processed image, the examination is not being displayed on the display unit, the radiographic imaging apparatus 1 is able to output the processed image to the image management server at timing of acquisition of the processed image.

<Registration Processing of Processed Image>

Figure 17:
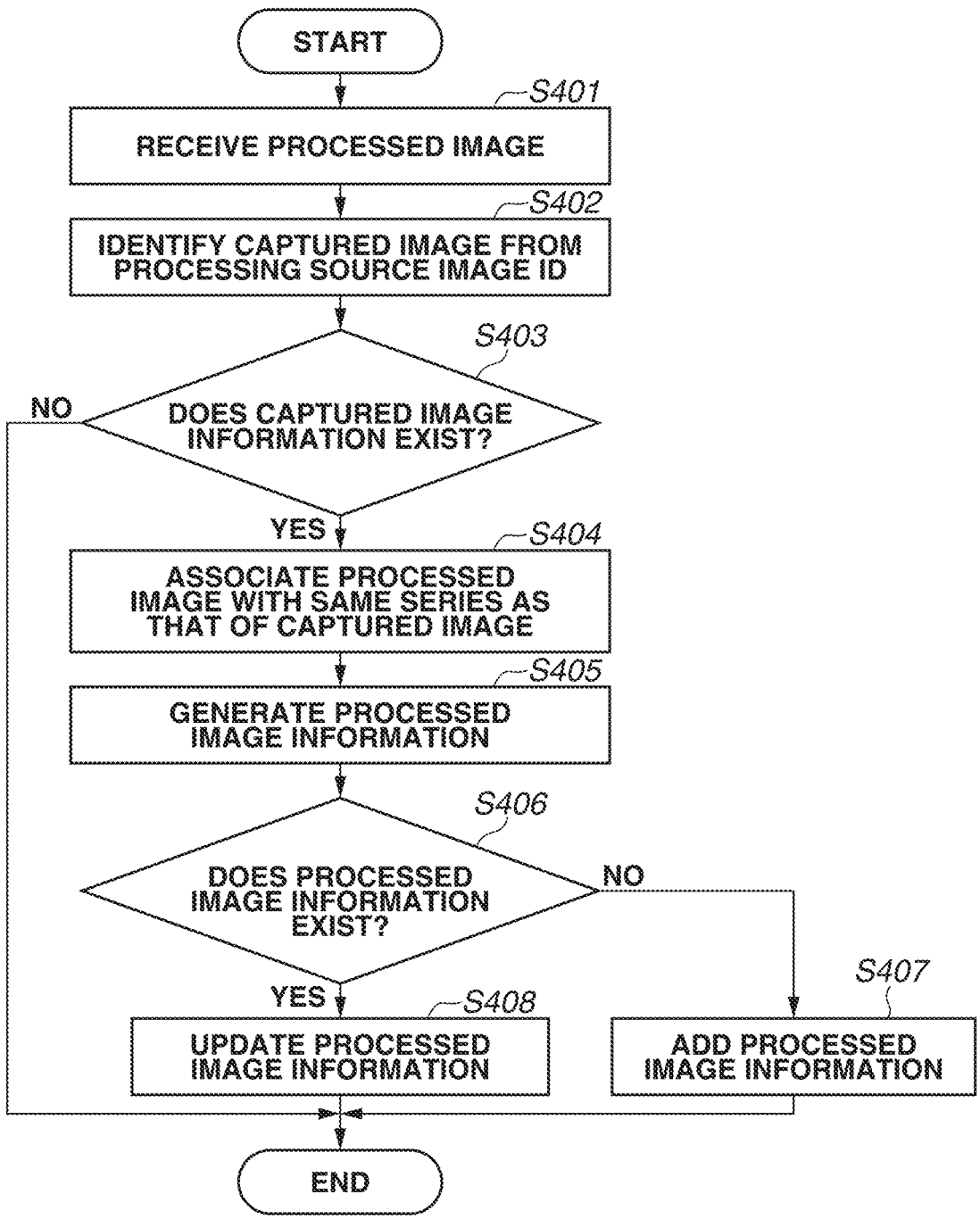
FIG. 17 is a flowchart illustrating an example of a processing procedure of registration processing for a processed image as a medical information processing method which is performed by the radiographic imaging apparatus according to the sixth exemplary embodiment.

FIG. 17 is a flowchart illustrating an example of a processing procedure of processed image registration processing as a medical information processing method which the control unit 5 of the radiographic imaging apparatus 1 in the sixth exemplary embodiment performs. The following description is made with reference to an imaging screen illustrated in FIG. 16. First, when the operator presses the external processing button 130, the control unit 5 outputs an image object which is being displayed to an external system. Next, when processing is completed by the external system, in step S401, the control unit 5 receives a generated processed image. To the received processed image, an image ID of an original image of the processed image is appended, and, in step S402, the control unit 5 searches for image information about the captured image from the image table with the image ID used as a key. If the image information has not been extracted (NO in step S403), the control unit 5 ends the processing in the flowchart of FIG. 17. If the image information has been extracted (YES in step S403), the control unit 5 advances the processing to step S404. In step S404, the control unit 5 associates the processed image with the same series as that of the captured image. The control unit 5 uses a series ID included in information about the captured image extracted in step S402 as a series ID of the processed image. In step S405, the control unit 5 generates information about the processed image as processed image information. An ID for discriminating the processed image itself is appended to the image received in step S401. In step S406, the control unit 5 searches the image table with use of the discrimination ID of the processed image and determines whether the same processed image information is currently stored. If it is determined that the same processed image information exists (YES in step S406), then in step S408, the control unit 5 updates the stored processed image information with the processed image information generated in step S405. If it is determined that the same processed image information does not exist (NO in step S406), then in step S407, the control unit 5 adds the processed image information generated in step S405. Thus, the processing performed in step S406 to step S408 is equivalent to processing for, in a case where it is determined that association information about a first processed image, association of which with an original image has already been performed, is identical to association information about a second processed image, which has been newly acquired, updating the association information about the first processed image with the association information about the second processed image and, in a case where it is determined that the association information about the first processed image is different from the association information about the second processed image, newly generating the association information about the second processed image.

<Display Processing of Processed Image>

Figure 18:
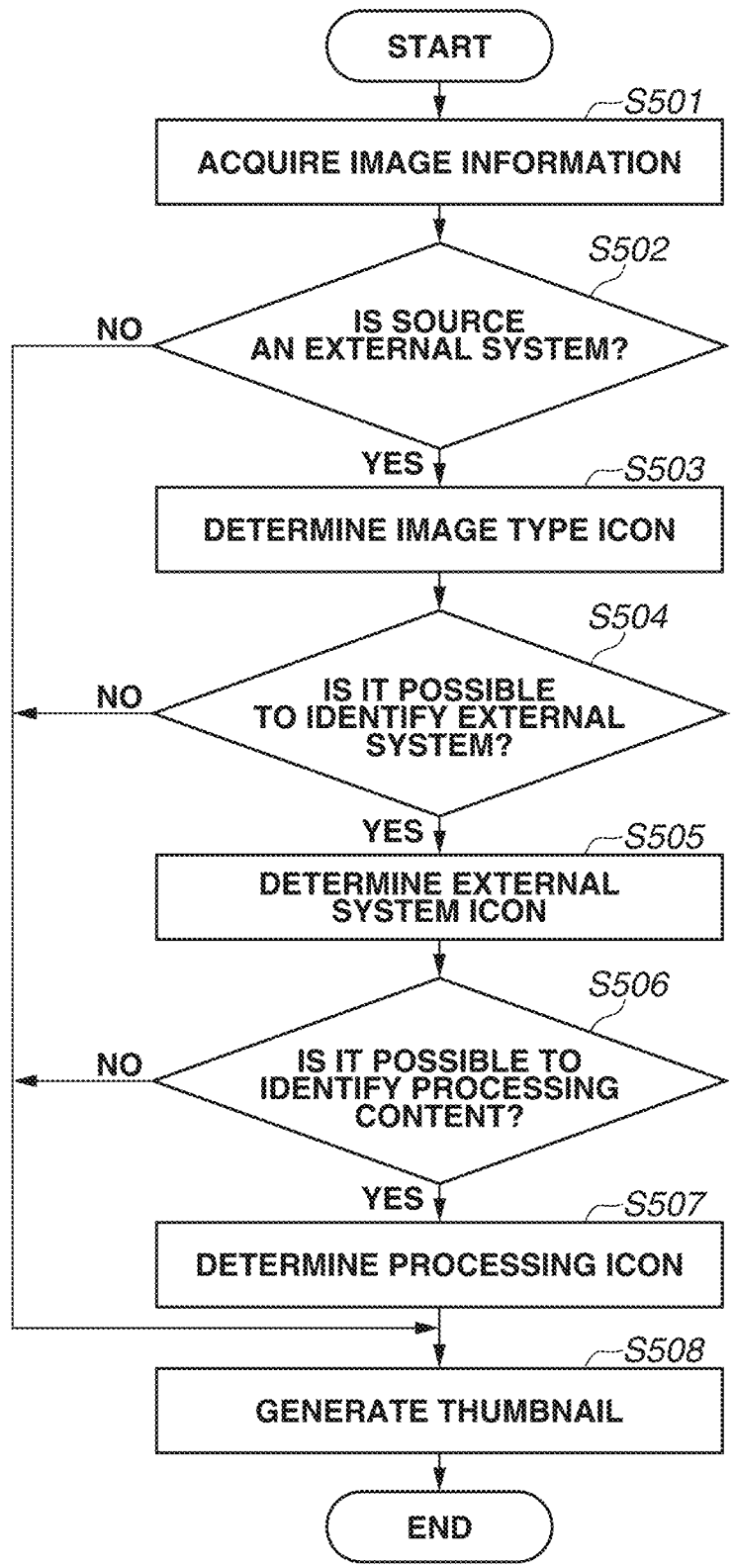
FIG. 18 is a flowchart illustrating an example of a processing procedure of display processing for a processed image as a medical information processing method which is performed by the radiographic imaging apparatus according to the sixth exemplary embodiment.

FIG. 18 is a flowchart illustrating an example of a processing procedure of display processing of a processed image on a screen as a medical information processing method which the control unit 5 of the radiographic imaging apparatus 1 in the sixth exemplary embodiment performs. The following description is made with reference to an imaging screen illustrated in FIG. 16.

First, in step S501, the control unit 5 acquires target image information from the image table. The control unit 5 refers to a source attribute of the image information, and, if the source is not an external system (NO in step S502), the control unit 5 advances the processing to step S508. If the source is an external system (YES in step S502), the control unit 5 advances the processing to the following external processing icon determination processing. First, in step S503, the control unit 5 determines an image type icon. Since, in step S502, it is determined that the source is an external system, the control unit 5 determines an icon indicating that the image type is an external system.

Next, the control unit 5 refers to source information about the image information acquired in step S501 and, if it is impossible to identify up to which external system the source is (NO in step S504), the control unit 5 advances the processing to step S508.

If it is possible to identify an external system (YES in step S504), then in step S505, the control unit 5 determines an external system icon. As the external system icon, an icon representing, for example, a feature of the external system is used.

Next, the control unit 5 refers to the processing content of the image information acquired in step S501, and, if it is impossible to identify the processing content (NO in step S506), the control unit 5 advances the processing to step S508. If it is possible to identify the processing content (YES in step S506), then in step S507, the control unit 5 determines a processing icon. As the processing icon, an icon representing the applied processing content is used.

In this way, upon completing the external processing icon determination processing, then in step S508, the control unit 5 generates a thumbnail and displays the thumbnail on a screen. For example, the control unit 5 displays an icon 115 in superimposition on a thumbnail image such as a thumbnail 114b in the imaging method button 109a. Furthermore, the control unit 5 can perform not only the above-mentioned superimposition display but also composite display or parallel display. Moreover, while an image type icon, an external system icon, and a processing icon have been described as separate icons, one icon obtained by combining these icons can be employed. Furthermore, a display indicating the above-mentioned information can be, for example, text data or can be, for example, a frame border surrounding a thumbnail in such a way as to emphasize the thumbnail of a processed image as compared with the thumbnail of an original image. Thus, the display needs to be an object which makes the thumbnail of a processed image and the thumbnail of an original image discriminable from each other. Moreover, the text data can represent a difference in information by changing a font, character size, or character color. Thus, an object indicating that the processed image is an image processed by an external system can be displayed, and the thumbnail of the processed image and the object indicating that the processed image is an image processed by an external system can be displayed in any one of display forms including superimposition display, parallel display, and composite display. Moreover, an object indicating an external system which has performed processing of the processed image can be displayed based on information concerning an external system, and the thumbnail of the processed image and the object indicating an external system which has performed processing of the processed image can be displayed in any one of display forms including superimposition display, parallel display, and composite display. Moreover, an object indicating a processing content applied to the processed image can be displayed, and the thumbnail of the processed image and the object indicating a processing content applied to the processed image can be displayed in any one of display forms including superimposition display, parallel display, and composite display. Additionally, an object indicating that the original image is an image not yet processed by an external system can be displayed, and the thumbnail of the original image and the object indicating that the original image is an image not yet processed by an external system can be displayed in any one of display forms including superimposition display, parallel display, and composite display. Thus, the thumbnail of a processed image needs to be able to be displayed in a display form different from that for the thumbnail of an original image in such a way as to enable discriminating that the processed image is an image processed by an external system.

According to the above-described configuration, it is possible to make a captured image and a processed image discriminable from each other. Moreover, since, even in a case where processing which the operator is able to perform differs depending on images, it is possible to discriminate between a captured image and a processed image, it is possible to increase efficiency of an operation. Moreover, since an object indicating an external system which has performed processing of the processed image is displayed on the display unit, it is possible to readily recognize an image processed by which external system the processed image is, without referring to the appended information. Additionally, since an object indicating a processing content applied to the processed image is displayed on the display unit, it is possible to readily recognize the processing content applied to the processed image, without referring to the appended information. Moreover, since a captured image and a processed image are automatically associated with each other and association by a manual operation becomes not required, it is possible to increase efficiency of an operation.

The processes (e.g., flowcharts) in the present specification can also be implemented by processing for supplying a program for implementing one or more functions in the above-described exemplary embodiments to a system or apparatus via a network or a storage medium and causing one or more processors in a computer of the system or apparatus to read out and execute the program. Moreover, the disclosure in the present specification can also be implemented by a circuit which implements the above-mentioned one or more functions.

The processor or circuit can include a central processing unit (CPU), a micro processing unit (MPU), a graphics processing unit (GPU), an application specific integrated circuit (ASIC), or a field-programmable gate array (FPGA). Moreover, the processor or circuit can include a digital signal processor (DSP), a data flow processor (DFP), or a neural processing unit (NPU).

The radiographic imaging apparatus in each of the above-described exemplary embodiments can be configured as a single apparatus or can be configured to perform the above-described processing by combining a plurality of apparatuses in such a way as to be able to communicate with each other, and these configurations are included in exemplary embodiments of the present disclosure. A shared server apparatus or server group can be used to perform the above-described processing. A plurality of apparatuses constituting a radiographic imaging apparatus or radiographic imaging system needs to be able to communicate with each other at a predetermined communication rate, and does not need to exist in one and the same facility or in one and the same country.

The exemplary embodiments disclosed in the present specification include a configuration which supplies a program of software for implementing functions of the above-described exemplary embodiments to a system or apparatus and causes a computer of the system or apparatus to read out and execute code of the supplied program.

Accordingly, program code itself, which is installed on a computer to cause the computer to implement the processing in each exemplary embodiment, is also one of exemplary embodiments of the present disclosure. Moreover, functions of the above-described exemplary embodiments can also be implemented by processing in which, for example, an operating system (OS) running on a computer performs a part or the entirety of the actual processing based on instructions included in a program which the computer has read out.

According to a medical information processing apparatus in exemplary embodiments of the present disclosure, since association between a captured image and a processed image, which has been generated by an external system with the captured image set as an original image, is automatically performed, it is possible to increase efficiency of an operation. Association between the captured image and the processed image is automatically performed without being performed by an external system. Therefore, there occurs no errors in the association performed by an operator's manual operation and changing of the specifications for every external system becomes unnecessary, so that it is possible to efficiently perform an operation.

Moreover, according to an aspect of the present disclosure, it is possible to make a captured image and a processed image discriminable from each other.

While the present disclosure has been described with reference to exemplary embodiments, it is to be understood that the claims are not limited to the disclosed exemplary embodiments. The scope of the following claims is to be accorded the broadest reasonable interpretation so as to encompass all such modifications and equivalent structures and functions.

This application claims the benefit of Japanese Patent Applications No. 2021-191530 filed Nov. 25, 2021 and No. 2021-191529 filed Nov. 25, 2021, which are hereby incorporated by reference herein in their entirety.

What is claimed is:

1. A medical information processing apparatus comprising:
one processor or more processors; and
one or more memories coupled to the one or more processors, the one or more memories having instructions that, when executed by the one or more processors, perform operations as:
a transmission unit configured to transmit an original image, which is a medical image captured by an imaging apparatus and which serves as a processing object in an external system, to the external system;
an acquisition unit configured to acquire a processed image from the external system; and
a display control unit configured to display a thumbnail of the original image and a thumbnail of the processed image on a display unit,
wherein the display control unit displays the thumbnail of the processed image in a display form different from that for the thumbnail of the original image in such a manner that the processed image is discriminable from the original image, and in a case where there is a plurality of processed images, the display control unit displays thumbnails of the plurality of processed images in display forms different from each other,
wherein the one or more processors further perform operations as an association unit configured to associate the original image and the processed image with each other,
wherein the display control unit displays the thumbnail of the original image and the thumbnail of the processed image on the display unit based on association performed by the association unit, and
wherein the display control unit displays the thumbnail of the original image and the thumbnail of the processed image in superimposition on an object indicating an imaging protocol used for capturing the original image.

2. The medical information processing apparatus according to claim 1, wherein the display control unit displays an object indicating that the processed image is an image subjected to processing in the external system, and displays the thumbnail of the processed image and the object in any one of display forms including superimposition display, parallel display, and composite display.

3. The medical information processing apparatus according to claim 1,
wherein the acquisition unit acquires information concerning the external system which has performed processing of the processed image, and
wherein the display control unit displays an object indicating the external system which has performed processing of the processed image based on the information concerning the external system, and displays the thumbnail of the processed image and the object in any one of display forms including superimposition display, parallel display, and composite display.

4. The medical information processing apparatus according to claim 1,
wherein the acquisition unit acquires information concerning a processing content applied to the processed image, and
wherein the display control unit displays an object indicating the processing content applied to the processed image, and displays the thumbnail of the processed image and the object in any one of display forms including superimposition display, parallel display, and composite display.

5. The medical information processing apparatus according to claim 1, wherein the display control unit displays an object indicating that the original image is an image obtained before being processed in the external system, and displays the thumbnail of the original image and the object in any one of display forms including superimposition display, parallel display, and composite display.

6. The medical information processing apparatus according to claim 1, wherein the one or more processors further perform operations as a reception unit configured to receive an instruction for image editing to a medical image from an operator,
wherein, in a case where the reception unit has received a limitation to an instruction for image editing to the processed image or an instruction for image editing to the processed image, the reception unit requests the display control unit to display a warning.

* * * * *